(12) United States Patent
Zhuang et al.

(10) Patent No.: US 12,738,809 B2
(45) Date of Patent: Sep. 15, 2026

(54) AXIAL FLUX MOTOR, ELECTRIC DEVICE, AND VEHICLE

(71) Applicants: CONTEMPORARY AMPEREX INTELLIGENCE TECHNOLOGY (SHANGHAI) LIMITED, Shanghai (CN); CONTEMPORARY AMPEREX TECHNOLOGY CO., LIMITED, Ningde City (CN)

(72) Inventors: Zhaohui Zhuang, Shanghai (CN); Ji Xia, Shanghai (CN)

(73) Assignees: CONTEMPORARY AMPEREX INTELLIGENCE TECHNOLOGY (Shanghai) LIMITED, Shanghai (CN); CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 219 days.

(21) Appl. No.: 18/678,252

(22) Filed: May 30, 2024

(65) Prior Publication Data

US 2024/0322650 A1 Sep. 26, 2024

Related U.S. Application Data

(63) Continuation of application No. PCT/CN2023/070184, filed on Jan. 3, 2023.

(51) Int. Cl.
*H02K 9/193* (2006.01)
*H02K 1/20* (2006.01)
*H02K 21/24* (2006.01)

(52) U.S. Cl.
CPC ............ *H02K 9/193* (2013.01); *H02K 21/24* (2013.01)

(58) Field of Classification Search
CPC .......... H02K 9/193; H02K 21/24; H02K 3/24; H02K 9/197; H02K 1/20
(Continued)

(56) References Cited

U.S. PATENT DOCUMENTS 5,334,899 A 8/1994 Skybyk
11,942,828 B2 * 3/2024 Zhang .................... H02K 5/203
(Continued)

FOREIGN PATENT DOCUMENTS

CN 108448822 A 8/2018
CN 109474114 A 3/2019
(Continued)

OTHER PUBLICATIONS

CN 193 Google Patents English Machine Translation (Year: 2021).*
(Continued)

*Primary Examiner* — Burton S Mullins
(74) *Attorney, Agent, or Firm* — Ladas & Parry LLP

(57) ABSTRACT

An axial flux motor, an electric device, and a vehicle are provided. The axial flux motor includes a housing defining an accommodation space, a stator assembly, a rotor assembly, and a partition assembly. The stator assembly and the rotor assembly are arranged in the accommodation space in an axial direction of the axial flux motor. The partition assembly includes a partition body arranged between the stator assembly and the rotor assembly. The housing cooperates with the partition body to form a cooling space for accommodating a coolant and the stator assembly, and the coolant in the cooling space is in direct contact with the stator assembly. With the above implementation, the partition body is disposed between the stator assembly and the rotor assembly, such that an inner space of the housing is reasonably utilized and thus the structure of the axial flux motor is more compact.

17 Claims, 24 Drawing Sheets

(58) Field of Classification Search
USPC ........................................................ 310/54
See application file for complete search history.

(56) References Cited

U.S. PATENT DOCUMENTS

| | | | |
|---|---|---|---|
| 12,160,155 B2* | 12/2024 | Leijnen .................... | H02K 3/24 |
| 2019/0013707 A1 | 1/2019 | Mihaila et al. | |
| 2022/0286001 A1 | 9/2022 | Leijnen | |

FOREIGN PATENT DOCUMENTS

| | | |
|---|---|---|
| CN | 209627103 U | 11/2019 |
| CN | 209659095 U | 11/2019 |
| CN | 113037040 A | 6/2021 |
| CN | 214154224 U | 9/2021 |
| CN | 112383193 A | 12/2021 |
| CN | 216530754 U | 5/2022 |
| JP | 2020195180 A | 12/2020 |
| KR | 960038858 U | 12/1996 |

OTHER PUBLICATIONS

Intention to Grant for EP application No. 23855948.8, dated Sep. 23, 2025.

International Search Report for PCT application No. PCT/CN2023/070184, dated Jun. 23, 2023.

Written Opinion of International Searching Authority for PCT application No. PCT/CN2023/070184, dated Jun. 23, 2023.

Extended European Search Report for EP application No. 23855948.8, dated Dec. 13, 2024.

* cited by examiner 427
423

AXIAL FLUX MOTOR, ELECTRIC DEVICE, AND VEHICLE

CROSS REFERENCE TO RELATED APPLICATION

This application is a continuation of International Patent Application No. PCT/CN2023/070184, filed on Jan. 3, 2023, which is incorporated by reference in its entirety.

TECHNICAL FIELD

The present disclosure relates to the field of flux motors, and more particularly, to an axial flux motor, an electric device, and a vehicle.

BACKGROUND

An electric device often uses a motor as a power source to perform the corresponding action process. For example, vehicles, such as electric vehicles, employ motors, such as induction motors and permanent magnet motors, to drive the vehicles and capture braking energy as used as a generator. At present, two common types of motors include radial flux motors and axial flux motors. The axial flux motors are relatively light, produce an increased power, and have compact dimensions as compared to the radial flux motors.

However, the power density of the axial flux motor is large, and the motor generates much heat when it is working. The existing heat dissipation manners for the axial flux motor are inefficient, and thus it is difficult to meet the heat dissipation requirements of the axial flux motor.

SUMMARY

A main object of the present disclosure is to provide an axial flux motor, an electric device, and a vehicle, which aim to solve the above technical problems in the related art.

In order to solve the above problems, the present disclosure provides an axial flux motor. The axial flux motor includes a housing defining an accommodation space, a stator assembly and a rotor assembly that are arranged in the accommodation space in an axial direction of the axial flux motor, and a partition assembly including a partition body. The partition body is arranged between the stator assembly and the rotor assembly. The housing cooperates with the partition body to form a cooling space for accommodating a coolant and the stator assembly, and the coolant in the cooling space is in direct contact with the stator assembly. Thus, an inner space of the housing is reasonably utilized by disposing the partition body between the stator assembly and the rotor assembly, and therefore the structure of the axial flux motor is more compact. The housing cooperates with the partition body to form a cooling space, and the coolant is in direct contact with the stator assembly, such that heat exchange between the coolant and the stator assembly can be efficiently achieved to improve the cooling efficiency of the stator assembly.

In an embodiment, the housing includes an end plate portion, and the end plate portion has an inner end surface arranged towards a side of the stator assembly facing away from the rotor assembly. The inner end surface of the end plate portion is spaced apart from the partition body in the axial direction to define two side boundaries of the cooling space in the axial direction. Thus, the boundaries of the cooling space are defined by the end plate portion and the partition body, and it is thus possible to improve the utilization rate of the accommodating space of the housing and to make the structure of the entire axial flux motor more compact.

In an embodiment, the housing includes two cylindrical portions arranged in a sleeved manner in a radial direction of the axial flux motor, and the two cylindrical portions are sealingly engaged with the partition body, respectively. The cooling space is of a ring shape. Thus, the stator assembly can be sealed in the cooling space with a relatively simple structure, reducing the risk of coolant leakage.

In an embodiment, the two cylindrical portions include a first cylindrical portion and a second cylindrical portion provided around the first cylindrical portion. The first cylindrical portion and the second cylindrical portion extend towards the stator assembly, and a rotary shaft of the rotor assembly passes through the first cylindrical portion. The partition body includes an inner ring matching portion and an outer ring matching portion provided around the inner ring matching portion. The inner ring matching portion is sealingly engaged with the first cylindrical portion, and the outer ring matching portion is sealingly engaged with the second cylindrical portion. Thus, the stator assembly can be sealed in the annular cooling space with a relatively simple structure, reducing the risk of coolant leakage and reducing interference with the rotor assembly.

In an embodiment, the partition body is embedded inside the second cylindrical portion, and a sealing engagement is formed between an outer peripheral surface of the outer ring matching portion and an inner peripheral surface of the second cylindrical portion; and/or the inner ring matching portion is provided with a third cylindrical portion, and the third cylindrical portion and the first cylindrical portion are connected to each other in an insertion manner to form a sealing engagement between the third cylindrical portion and the first cylindrical portion. Thus, the partition body is located in the accommodating space, such that the partition body is protected well while forming the cooling space. In addition, a good alignment and sealing effect are achieved through the insertion engagement between the third cylindrical portion and the first cylindrical portion.

In an embodiment, the third cylindrical portion is attached to an outer periphery of the first cylindrical portion in the insertion manner. The axial flux motor further includes a bearing provided in the first cylindrical portion. The partition body includes an oil collection plate engaged with the first cylindrical portion to form an oil reservoir. Thus, it is possible to improve the lubrication continuity and stability of the bearing.

In an embodiment, the oil collection plate is connected to the third cylindrical portion, and extends towards an inside of the third cylindrical portion in the radial direction of the axial flux motor. Thus, the assembly process of the oil collection plate can be simplified, and the structural strength of the partition body can also be enhanced by the oil collection plate.

In an embodiment, the stator assembly includes a stator iron core and a coil wound around the stator iron core, the stator iron core has a plurality of stator slots, and the coil is embedded in the plurality of stator slots. The partition body includes a plurality of embedded ribs, the plurality of embedded ribs is positioned in one-to-one correspondence with the plurality of stator slots, and each of the plurality of embedded ribs is embedded in a corresponding one of the plurality of stator slots. Thus, the coil in the stator slot can be effectively fixed by embedding the embedded rib in the stator slot.

In an embodiment, the housing includes a first cylindrical portion and a second cylindrical portion provided around the first cylindrical portion, the first cylindrical portion and the second cylindrical portion extend towards the stator assembly, and a rotary shaft of the rotor assembly passes through the first cylindrical portion. The partition body includes an inner ring matching portion and an outer ring matching portion provided around the inner ring matching portion. The inner ring matching portion is sealingly engaged with the first cylindrical portion, and the outer ring matching portion is sealingly engaged with the second cylindrical portion. The plurality of stator slots and the plurality of embedded ribs are radially spread with respect to the axial direction. The plurality of embedded ribs is connected to the inner ring matching portion and/or the outer ring matching portion, respectively. Thus, the assembly process of the embedded ribs can be simplified, while the inner ring matching portion and/or the outer ring matching portion can be fixed with the aid of the embedded ribs, thereby improving the structural stability.

In an embodiment, the partition body further includes a blocking plate configured to block gaps among the plurality of embedded ribs. Thus, the sealing of the cooling space can be enhanced by the blocking plate.

In an embodiment, the inner ring matching portion and/or the outer ring matching portion are sealingly engaged with the stator assembly. Thus, the sealing of the cooling space can be enhanced.

In an embodiment, the partition assembly includes a reinforcement member of a cylindrical shape, the reinforcement member is supported at a side of the partition body facing away from the stator assembly, and the rotor assembly is disposed within the reinforcement member. Thus, the structural stability of the partition body can be improved by the reinforcement member.

In an embodiment, the reinforcement member is engaged with the housing. Thus, the structural stability of the partition body can be improved by the reinforcement member.

In an embodiment, the partition assembly has a plurality of pressure relief holes formed at intervals in a circumferential direction of the axial flux motor. Thus, the air pressure fluctuations caused by the rotor assembly during operation can be balanced by the pressure relief holes.

In an embodiment, the rotor assembly is spaced apart from the partition body in the axial direction. An air gap is formed between the rotor assembly and the partition body. The air gap is in communication with an outer space of the partition assembly through the plurality of pressure relief holes. Thus, the air pressure fluctuations in the air gap caused by the operation of the rotor assembly can be balanced by the pressure relief holes.

In an embodiment, the partition assembly further has a flow return hole, and a coolant permeated into the partition assembly from the cooling space is discharged to an outer space of the partition assembly. Thus, adverse effects on the axial flux motor due to coolant leakage in the cooling space can be alleviated.

In an embodiment, the partition assembly includes a reinforcement member of a cylindrical shape, and the reinforcement member is supported at a side of the partition body facing away from the stator assembly. The rotor assembly is disposed inside the reinforcement member, and the flow return hole is formed at the reinforcement member. Thus, adverse effects on the rotor assembly due to coolant leakage in the cooling space can be alleviated.

In an embodiment, the reinforcement member further has a plurality of pressure relief holes, and the plurality of pressure relief holes is arranged at intervals at an edge of the reinforcement member facing towards the partition body in a circumferential direction of the axial flux motor. The flow return hole is centrally located with respect to edges of the reinforcement member at two sides in the axial direction. Thus, the pressure relief effect of the pressure relief holes and the backflow effect of the flow return hole can be enhanced.

In an embodiment, the stator assembly includes a stator iron core of a ring shape and a coil wound around the stator iron core, and the coil protrudes from two opposite ring side surfaces of the stator iron core in a radial direction of the axial flux motor to form an inner ring coil portion and an outer ring coil portion. The inner ring coil portion and/or the outer ring coil portion are located in the cooling space, and the coolant in the cooling space is in direct contact with the inner ring coil portion and/or the outer ring coil portion. Thus, the cooling efficiency of the stator assembly can be improved.

In an embodiment, the housing includes an end plate portion having an inner end surface arranged towards a side of the stator assembly facing away from the rotor assembly. A cooling channel is formed at the inner end surface of the end plate portion, a side of the partition body facing towards the end plate portion, and/or the stator assembly. The coolant in the cooling space flows along the cooling channel. Thus, the cooling efficiency of the stator assembly can be improved.

In an embodiment, the housing includes an end plate portion having an inner end surface arranged towards a side of the stator assembly facing away from the rotor assembly. The inner end surface has a cooling channel allowing for flowing of the coolant, and the stator assembly covers at least part of the cooling channel. The coolant flowing in the cooling channel is in direct contact with the stator assembly. The coolant in the cooling channel is in direct contact with the stator assembly, such that heat exchange between the coolant and the stator assembly can be efficiently achieved to improve the cooling efficiency of the stator assembly.

In an embodiment, the stator assembly includes a stator flange including a disc-shaped body, and a stator iron core attached and fixed to a main surface of the disc-shaped body at a side facing away from the end plate portion. The disc-shaped body covers at least part of the cooling channel, and the coolant flowing in the cooling channel is in direct contact with the disc-shaped body. The stator flange is used for fixing the stator iron core, and the stator flange is used as a basis for engaging with the housing, thereby reducing assembly difficulty.

In an embodiment, the stator assembly further includes a coil wound around the stator iron core, and the stator iron core and the disc-shaped body each are of a ring shape. The coil protrudes from two opposite ring side surfaces of the stator iron core in a radial direction of the axial flux motor to form an inner ring coil portion and an outer ring coil portion. At least one of the inner ring coil portion and the outer ring coil portion is arranged to extend beyond the disc-shaped body in the radial direction of the axial flux motor or to maintain a predetermined gap with the disc-shaped body in the axial direction of the axial flux motor, and the coolant is in direct contact with the at least one of the inner ring coil portion and the outer ring coil portion. Thus, the coolant can be brought into direct contact with the inner ring coil portion and/or the outer ring coil portion through a predetermined gap, improving the cooling efficiency of the stator assembly.

In an embodiment, the cooling channel includes at least two circumferential channels spaced apart from each other in a radial direction of the axial flux motor, and at least one radial channel arranged in the radial direction of the axial flux motor and in communication with the at least two circumferential channels. Thus, the range of contact of the coolant with the stator assembly is wider, further improving the cooling efficiency of the coolant on the stator assembly.

In an embodiment, the stator assembly includes a first stator component and a second stator component spaced apart from each other in the axial direction. The rotor assembly is located between the first stator component and the second stator component. The partition body includes a first partition body and a second partition body, the first partition body is engaged with the housing to form a first cooling space for accommodating the coolant and the first stator component, and the second partition body is engaged with the housing to form a second cooling space for accommodating the coolant and the second stator assembly. Thus, the stability and output efficiency of the axial flux motor are improved by the two stator components, and the coolant is brought into contact with the two stator components at the same time, such that the cooling efficiency of the axial flux motor is improved.

In an embodiment, the partition assembly has communication passages for communicating the first cooling space and the second cooling space. Thus, the first cooling space and the second cooling space are connected to each other through the communication passage, such that it is possible to allow the coolant to flow through the first cooling space and the second cooling space, simplifying the circulation manner of the coolant.

In an embodiment, the communication passages include a first communication passage and a second communication passage opposite to each other in a radial direction of the axial flux motor. Thus, the consistency of the cooling effects of the two cooling spaces can be improved.

In an embodiment, the housing includes a first end plate portion and a second end plate portion spaced apart from each other in the axial direction. The stator assembly and the rotor assembly are arranged between the first end plate portion and the second end plate portion in the axial direction. One of the first end plate portion and the second end plate portion has a liquid inlet and a liquid outlet, and the liquid inlet and the liquid outlet are respectively opposite to the first communication passage and the second communication passage in the axial direction of the axial flux motor. Thus, the consistency of the cooling effects of the two cooling spaces can be improved.

In an embodiment, the partition assembly further includes a reinforcement member of a cylindrical shape and a passage member, and the reinforcement member and the passage member are connected between the first partition body and the second partition body. The rotor assembly is disposed inside the reinforcement member. The passage member is disposed outside the reinforcement member. The communication passages are formed at the passage member. Thus, it is possible to improve the structural stability of the first partition body and the second partition body while mitigating the interference of the communication passages with the rotor assembly and adverse effects of the coolant leakage in the communication passages on the rotor assembly.

In an embodiment, the housing includes a first cylindrical portion, a rotary shaft of the rotor assembly is rotatably supported in the first cylindrical portion, and the first cylindrical portion at least partially overlaps the stator assembly in the axial direction. Thus, the axial dimension of the axial flux motor can be reduced to make the structure of the entire axial flux motor more compact.

In an embodiment, the stator assembly and/or the rotor assembly includes a flange including a disc-shaped body and an iron core portion. The disc-shaped body has a plurality of through grooves connecting main surfaces of the disc-shaped body at two sides of the disc-shaped body. The iron core portion is provided with a plurality of protrusions corresponding to the plurality of through grooves, and each of the plurality of protrusions is inserted in a corresponding one of the plurality of through grooves. The disc-shaped body and the iron core portion are welded and fixed to each other along engagement edges of the plurality of through grooves and the plurality of protrusions. Thus, the difficulty in machining and assembling the core portions of the stator assembly and/or the rotor assembly is reduced, and the electromagnetic loss of the core portions is reduced.

In an embodiment, the rotor assembly includes a rotor iron core, magnetic blocks, and a stopper. The rotor iron core has rotor slots, each of which has an open end located at an outer circumferential surface of the rotor iron core. Each of the magnetic blocks is provided in one of the rotor slots. The stopper is provided outside the rotor iron core in a radial direction of the rotor assembly, and shields the open ends in the axial direction of the rotor assembly. Thus, the magnetic blocks are limited within the rotor slots by the stopper to reduce the risk of the magnetic blocks being disengaged from the rotor slots, which can increase the extreme rotation speed capability of the rotor assembly.

In an embodiment, the stopper has an annular structure surrounding the rotor iron core in a circumferential direction of the rotor assembly. The rotor assembly further includes a rotor flange including a disc-shaped body. The rotor iron core is attached and fixed to a main surface of the disc-shaped body at a side of the disc-shaped body. The stopper is separated from the rotor flange, or the stopper is fixed to the disc-shaped body. Thus, the separate configuration of the stopper and the rotor flange can simplify the processing difficulty of the rotor flange, and fixing the stopper to the disc-shaped body can improve the structural stability of the stopper and improve the stopping effect.

In an embodiment, the rotor assembly includes a first rotor component and a second rotor component. The first rotor component includes a first rotor flange and a first rotor iron core. The first rotor flange includes a first disc-shaped body and a rotary shaft provided at the first disc-shaped body, and the first rotor iron core is provided at a main surface of the first disc-shaped body and arranged around the rotary shaft. The second rotor component includes a second rotor flange and a second rotor iron core. The second rotor flange includes a second disc-shaped body and a shaft hole portion provided at the second disc-shaped body, the second rotor iron core is provided at a main surface of the second disc-shaped body, the shaft hole portion has a shaft hole, and the rotary shaft is inserted into the shaft hole in the axial direction of the rotor assembly. Another main surface of the first disc-shaped body facing away from the first rotor iron core and another main surface of the second disc-shaped body facing away from the second rotor iron core are attached and fixed to each other. Thus, the assembly difficulty of the two rotor components can be reduced.

In an embodiment, one of the first disc-shaped body and the second disc-shaped body is fixed to another one of the first disc-shaped body and the second disc-shaped body through welding along an outer circumferential surface of the one of the first disc-shaped body and the second disc-shaped body. Thus, the manner of fixing the two rotor components can be simplified, and the fixing effect can be improved.

In an embodiment, at an end of the shaft hole portion facing away from the first disc-shaped body, the rotary shaft and the shaft hole portion are welded and fixed to each other along an edge of the shaft hole. In another embodiment, the rotary shaft includes an insertion portion and an engagement portion. The insertion portion is inserted into the shaft hole. A projection of the engagement portion in the axial direction of the rotor assembly overlaps the shaft hole portion. The engagement portion and the shaft hole portion are provided with a plurality of sets of fixing mating pairs, and the engagement portion and the shaft hole portion are fixed to each other by the plurality of sets of fixing matching pairs. Thus, the manner of fixing the two rotor components can be simplified, and the fixing effect can be improved.

To solve the above problems, the present disclosure provides an electric device including the axial flux motor as described in any one of the above embodiments.

To solve the above problems, the present disclosure provides a vehicle including the axial flux motor as described in any one of the above embodiments.

In comparison with the related art, the axial flux motor of the present disclosure includes a housing defining an accommodation space, a stator assembly and a rotor assembly that are arranged in the accommodation space in an axial direction of the axial flux motor, and a partition assembly including a partition body. The partition body is arranged between the stator assembly and the rotor assembly. The housing cooperates with the partition body to form a cooling space for accommodating a coolant and the stator assembly, and the coolant in the cooling space is in direct contact with the stator assembly. Thus, in the above embodiments, an inner space of the housing is reasonably utilized by disposing the partition body between the stator assembly and the rotor assembly, and therefore the structure of the axial flux motor is more compact. The housing cooperates with the partition body to form a cooling space for accommodating a coolant and the stator assembly, and the coolant is in direct contact with the stator assembly, such that heat exchange between the coolant and the stator assembly can be efficiently achieved to improve the cooling efficiency of the stator assembly.

BRIEF DESCRIPTION OF THE DRAWINGS

To more clearly illustrate the technical solutions of the embodiments of the present disclosure, a brief description will be given below of the accompanying drawings, which are required to be used in the description of the embodiments. It is obvious that the drawings in the description below are only some embodiments of the present disclosure, and it would be obvious for those skilled in the art to obtain other drawings based on the drawings without involving any inventive effort.

REFERENCE NUMERALS

Figure 1:
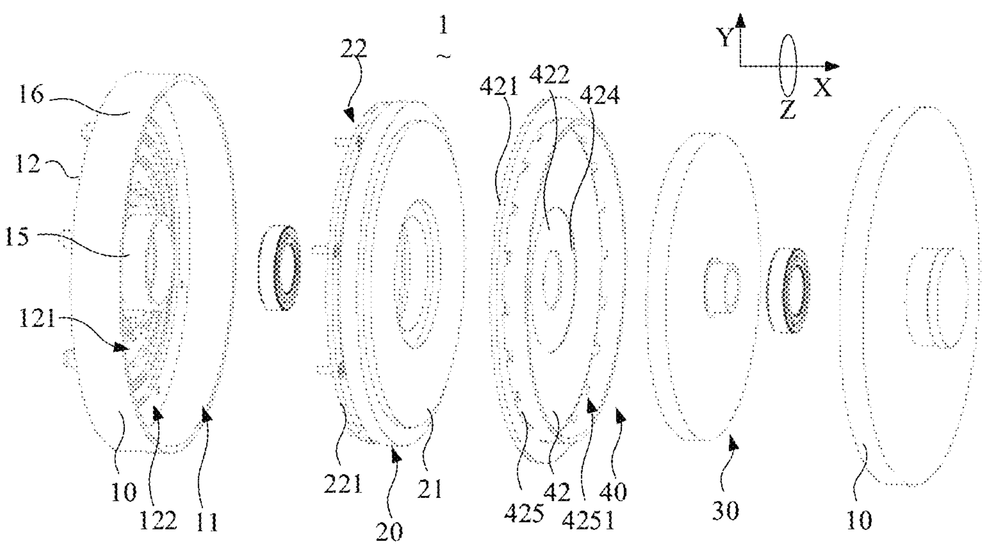
FIG. 1 is a schematic exploded view of an axial flux motor according to a first embodiment of the present disclosure.

- 1 axial flux motor; X axial direction; Y radial direction; Z circumferential direction;
- 10 housing; 11 accommodating space; 12 end plate portion; 121 inner end surface; **12*a* first end plate portion; 12*b* second end plate portion; 121*a* first inner end surface; 121*b* second inner end surface; 122 cooling channel; 1221 circumferential channel; 1222 radial channel; 12221 first radial channel; 12222 second radial channel; 123 mounting blind hole; 124 outer end surface; 1241 columnar portion; 13 liquid inlet; 14 liquid outlet; 15 first cylindrical portion; 16 second cylindrical portion; 17 annular rib; 122*a* first cooling channel; 122*b* second cooling channel; 20*a* first stator component; 20*b*** second stator component;
- 20 stator assembly; 21 stator iron core; 211 outer ring coil portion; 212 inner ring coil portion; 213 stator slot; 2131 open slot; 22 stator flange; 221 disc-shaped body; 2211 step hole; 22111 first hole segment; 22112 second hole segment; 2212 center portion; 2213 annular edge portion; 222 boss; 223 through groove; 2231 through groove grouping; 2221 protrusion; 23 fixing member; 24 step hole; 241 first hole segment; 242 second hole segment; 243 third hole segment; 25 fixing post; 251 internally threaded hole; 252 fixing column grouping;
- 30 rotor assembly; 31 rotor iron core; 311 rotor slot; 312 boss; 3121 protrusion; 3122 second through groove; 32 magnetic block; 33 stopper; 34 rotor flange; 341 disc-shaped body; 342 first through groove; **30*a* first rotor component; 31*a* first rotor iron core; 311*a* first rotor slot; 32*a* first magnetic block; 34*a* first rotor flange; 341*a* first disc-shaped body; 35*a* rotary shaft; 351*a* first annular platform; 352*a* insertion portion; 353*a* engagement portion; 354*a* first fixing hole; 3541*a* first outer hole segment; 3542*a* inner first hole segment; 30*b* second rotor component; 31*b* second rotor iron core; 311*b* second rotor slot; 32*b* second magnetic block; 34*b* second rotor flange; 341*b* second disc-shaped body; 35*b* shaft hole portion; 351*b* shaft hole; 352*b* second annular platform; 353*b* second fixing hole; 3531*b* second outer hole segment; 3532*b* second inner hole segment; 36 fixing matching pair; 37 fixing member; 38 positioning pin; 39** annular stopper;
- 40 partition assembly; 41 cooling space; 42 partition body; 421 inner ring matching portion; 422 outer ring matching portion; 423 third cylindrical portion; 424 oil collection plate; 4241 oil reservoir; 425 reinforcement member; 4251 pressure relief hole; 4252 flow return hole; 426 embedded rib; 427 blocking plate; **42*a* first partition body; 42*b* second partition body; 41*a* first cooling space; 41*b* second cooling space; 431 first communication passage; 432 second communication passage; 440** channel member.

DETAILED DESCRIPTION

Embodiments of the technical solutions of the present disclosure will be described in detail below in conjunction with the accompanying drawings. The following embodiments serve only to illustrate the technical solutions of the present disclosure more clearly, and are therefore given by way of examples without limiting the scope of the present disclosure.

Unless otherwise defined, all technical and scientific terms used herein have the same meaning as commonly understood by those skilled in the art of the present disclosure. Terms in a specification of the present disclosure herein are only used to describe specific embodiments, and are not intended to limit the present disclosure. The terms “including,” “having,” and any variation thereof in the description and claims of the present disclosure and in the preceding description of the figures are intended to cover non-exclusive inclusion.

In the description of the embodiments of the present disclosure, the technical terms “first”, “second” and the like are only used for distinguishing different objects, and are not to be understood as indicating or implying relative importance or implicitly indicating a number, a particular order or a primary or secondary relationship of the indicated technical features. In describing the embodiments of the present disclosure, the meaning of “a plurality of” is two or more, unless specifically and specifically limited otherwise.

In the present disclosure, reference to “embodiment” means that a particular feature, structure, or characteristic described in conjunction with the embodiment or implementation may be included in at least one embodiment of the present disclosure. The presence of the term at each place in the specification does not necessarily refer to the same embodiment, nor does it refer to a separate or alternative embodiment that is mutually exclusive of other embodiments. It is to be expressly and implicitly understood by those skilled in the art that the embodiments described herein may be combined with other embodiments.

In the description of the embodiments of the present disclosure, the term “and/or” only represents a relationship between correlated objects, including three relationships. For example, “A and/or B” may mean three situations: A only, B only, or both A and B. In addition, the character “/” in the present disclosure generally represents an “or” relationship between the correlated objects preceding and succeeding the symbol.

In the description of the embodiments of the present disclosure, the term “a plurality of” refers to two or more (including two), and similarly, “groups” refers to two or more (including two) groups, and “pieces” refers to two or more (including two) pieces.

In the description of the embodiments of the present disclosure, the orientations or positional relationships indicated by the technical terms "center," "longitudinal," "transverse," "length," "width," "thickness," "upper," "lower," "front," "rear," "left," "right," "upright," "horizontal," "top," "bottom," "inner," "outer," "clockwise," "counter-clockwise," "axial," "radial," "circumferential," and the like are based on the orientations or positional relationships shown in the drawings, to facilitate the description of the embodiments of the present disclosure and simplify the description, rather than indicating or implying that a device or element must have a particular orientation, be constructed and operated in a particular orientation, and therefore should not be construed as limiting the embodiments of the present disclosure.

According to the embodiments of present disclosure, unless explicitly stipulated and limited otherwise, the technical terms such as "mounted," "coupled," "connected," "fixed," and the like are to be appreciated in a broad sense, for example, the connection manner may be fixedly connected or detachably connected, or integrated; may be a mechanical connection or an electrical connection; it may be indirectly coupled through an intermediate medium, or may be the communication between two elements or the interaction relationship between two elements. For those skilled in the art, the specific meaning of the above terms in the embodiments of the present disclosure may be appreciated based on specific situations.

At present, from the development of the market situation, the application of the traction batteries is more extensive. The traction batteries are not only used in energy storage power systems such as hydraulic, fire, wind, and solar power plants, but also widely used in electric vehicles such as electric bicycles, motorcycles, electric vehicles, military equipment, and aerospace. As the field of traction battery application continues to expand, its market demand is constantly increasing.

In one of the embodiments provided herein, the axial flux motor of the present disclosure may be used in an electric device using a battery as a power source or in various energy storage systems using a battery as an energy storage element. The electric device may be, but is not limited to, an electric toy, a power tool, a battery car, an electric vehicle, a ship, a spacecraft, etc. The electric toys may include mobile electric toys, such as electric vehicle toys, electric boat toys, and electric aircraft toys. The spacecrafts may include airplanes, rockets, spaceplanes, spacecraft, and the like. The electric devices require not only converting electrical energy into kinetic energy to replace or partially replace fuel or natural gas to provide driving power, but also electric motors (i.e., electric machines) to generate torque to convert electrical energy into mechanical energy.

In another embodiment provided herein, the axial flux motor of the present disclosure may also be used in a vehicle, which may be, but is not limited to, a battery car, a fuel-powered car, a gas-powered car, a new-energy car, an electric vehicle, a ship, a spacecraft, and the like. The spacecraft may include an aircraft, a rocket, a spaceplane, a spacecraft, and the like. Taking a vehicle being an electric vehicle as an example, the electric vehicle not only needs to convert electric energy into kinetic energy to replace or partially replace fuel oil or natural gas to provide driving power for the vehicle, but also needs an electric motor (i.e., an electric machine) to generate torque to convert electric energy into mechanical energy.

Taking an example where both the vehicle and the electric device are electric vehicles, the electric vehicles (including hybrid vehicles) employ motors, such as induction motors and permanent magnet motors, to drive the vehicle and capture braking energy when used as a generator. The motor generally includes a rotor that rotates during operation and a stationary stator. At present, two common types of motors include radial flux motors and axial flux motors. In the radial flux motors, the rotor and the stator typically form a concentric or sleeved configuration that, when the stator is energized, generates a magnetic flux extending radially from the stator to the rotor. The conductive windings in the stator are arranged generally perpendicular to the rotation axis to generate a magnetic field, which is oriented with respect to the rotation axis (along the rotor shaft) in the radial direction. In the axial flux motors, however, the conductive wire windings in the stator generate a magnetic field parallel to the rotation axis, such that the magnetic flux extends parallel to the rotation axis (parallel to the rotor shaft). In some applications, the axial flux motors are desirable because they are relatively lightweight, produce an increased power, and are compact in dimension as compared to the radial flux motors. Therefore, the axial flux motors have significant application advantages over the radial flux motors at the same rotary speed in the application scenarios where dimension, weight, and the like are limited, for example, applications of drive motors of electric vehicles.

The power density of the axial flux motor is large, and the motor generates much heat when working. The current heat dissipation manner includes providing a water channel on the outer side of the axial flux motor to indirectly cool the stator and the rotor, but the cooling efficiency of the outer water channel arrangement for the stator and the rotor is relatively low Further, the stator is cooled only through indirect cooling, and the inner and outer coils of the stator cannot be fully cooled. In addition, the outer channel arrangement also requires mounting of an additional external cover plate and fastening, which causes low integration.

Figure 2:
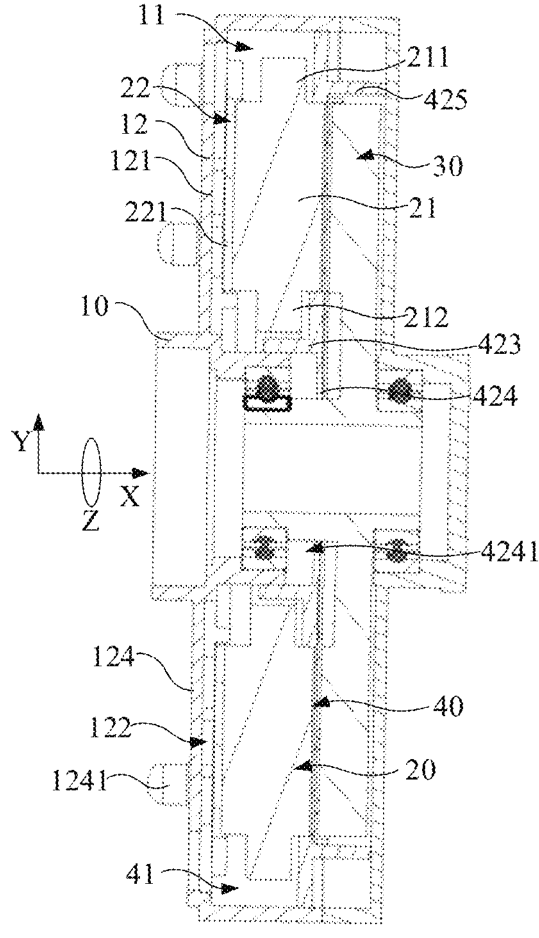
FIG. 2 is a schematic sectional view of the axial flux motor according to the first embodiment of the present disclosure.

In order to solve the technical problems of the axial flux motors in the related art, a coolant may be used to directly cool the stator and/or the rotor. The present disclosure provides an axial flux motor, with reference to FIGS. 1 and 2. FIG. 1 is a schematic exploded view of an axial flux motor according to a first embodiment of the present disclosure, and FIG. 2 is a schematic sectional view of the axial flux motor according to the first embodiment of the present disclosure.

An axial flux motor 1 includes a housing 10, a stator assembly 20, and a rotor assembly 30. The housing 10 defines an accommodating space 11, in which the stator assembly 20 and the rotor assembly 30 are arranged in an axial direction X of the axial flux motor 1. The housing 10 may be formed by assembling two hollow shells to form the accommodating space 11 in the housing 10. The stator assembly 20 and the rotor assembly 30 are located in the accommodating space 11, and the stator assembly 20 and the rotor assembly 30 can be protected by the housing 10.

In some feasible embodiments of the present disclosure, the housing 10 may include an end plate portion 12, and an inner end surface 121 of the end plate portion 12 is arranged towards a side of the stator assembly 20 facing away from the rotor assembly 30. The accommodating space 11 may be in a columnar shape, and the inner end surface 121 is a side end surface forming the accommodating space 11. The rotor assembly 30 rotates about a predetermined central axis during operation, and an extension direction of the central axis may be regarded as the axial direction X of the axial flux motor 1. The stator assembly 20 and the rotor assembly 30 are arranged in the accommodating space 11 along the axial direction X of the axial flux motor 1. That is, the end plate portion 12, the stator assembly 20, and the rotor assembly 30 are arranged in sequence along the axial direction X, such that the structure of the axial flux motor 1 may be more compact by reasonably using the inner space of the housing 10. Further, a radial direction Y of the axial flux motor 1 described hereinafter is a direction perpendicular to the axial direction X, and a circumferential direction Z of the axial flux motor 1 is a direction surrounding the axial direction X. Further, the axial, radial, and circumferential directions of the stator assembly 20 and the rotor assembly 30 described hereinafter are defined with reference to the directions indicated by X, Y, and Z.

A cooling channel 122 is provided at the inner end surface 121 of the end plate portion 12, and is arranged in such a manner that a coolant flowing in the cooling channel 122 is in direct contact with the stator assembly 20. The coolant is a fluid, and the coolant may flow in the cooling channel 122. In an exemplary embodiment, the coolant may be cooling oil, water, or the like. During the operation of the axial flux motor 1, the temperatures of the stator assembly 20 and the rotor assembly 30 gradually increase. For the operating efficiency of the axial flux motor 1 to remain unaffected, it is required to quickly cool the stator assembly 20 and the rotor assembly 30. In this embodiment, the cooling channel 122 is disposed at the inner end surface 121, and the coolant in the cooling channel 122 is in direct contact with the stator assembly 20, such that the heat exchange between the coolant and the stator assembly 20 can be efficiently realized to improve the cooling efficiency to the stator assembly 20.

Figure 3:
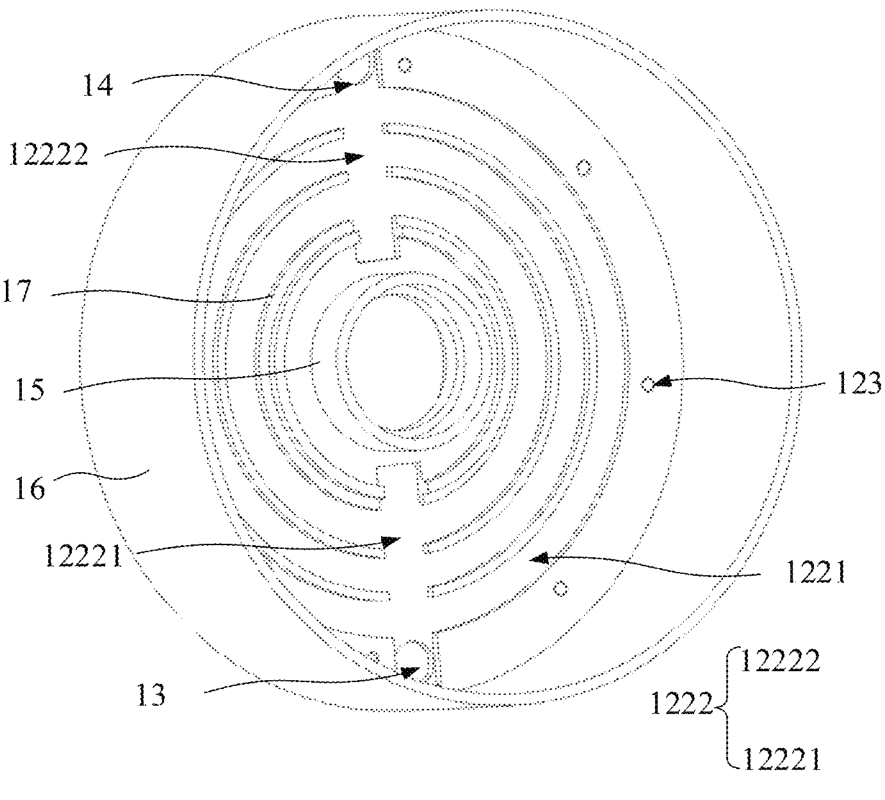
FIG. 3 is a schematic structural view of a housing according to an embodiment of the present disclosure.
Figure 4:
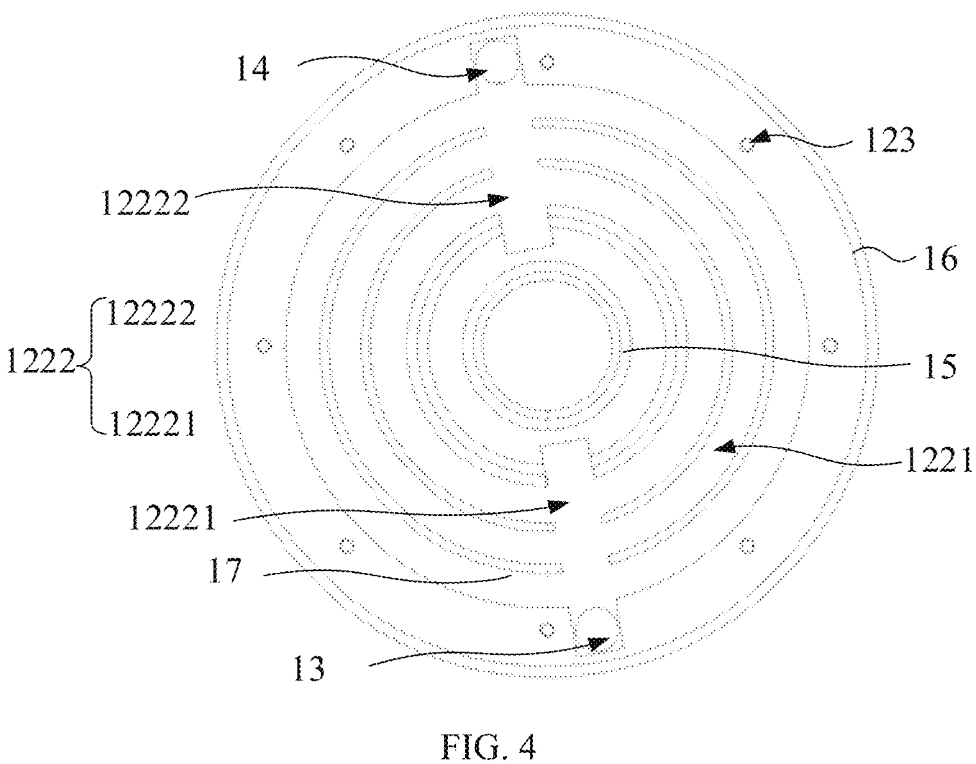
FIG. 4 is a schematic plan view of the housing shown in FIG. 3.

Referring to FIGS. 3 and 4, FIG. 3 is a schematic structural view of a housing according to an embodiment of the present disclosure, and FIG. 4 is a schematic plan view of the housing shown in FIG. 3.

The cooling channel 122 includes at least two circumferential channels 1221, and the at least two circumferential channels 1221 are spaced apart from each other in the radial direction Y of the axial flux motor 1. The function of the cooling channel 122 includes directing flow of the coolant and rapidly removing heat while the coolant flowing in the cooling channel 122 is in direct contact with the stator assembly 20. In the present embodiment, the cooling channel 122 is configured to include at least two circumferential channels 1221, such that a contact range of the coolant with the stator assembly 20 is greater, while the coolant regularly flows along the at least two circumferential channels 1221 in a predetermined direction, which further improve the cooling efficiency of the coolant to the stator assembly 20.

Further, the cooling channel 122 further includes a radial channel 1222 arranged along the radial direction Y of the axial flux motor 1, and the radial channel 1222 communicates with the at least two circumferential channels 1221 to allow the coolant to flow among the radial channel 1222 and the at least two circumferential channels 1221 simultaneously. The radial channel 1222 extends along the radial direction Y of the axial flux motor 1, such that the coolant in the radial channel 1222 can be rapidly distributed to each of the circumferential channels 1221 or coolants flowing out of the circumferential channels 1221 are converged, thereby improving the cooling efficiency to the stator assembly 20.

Furthermore, the radial channel 1222 include a first radial channel 12221 for distributing the coolant to the circumferential channels 1221 and a second radial channel 12222 for converging the coolants flowing out of the circumferential channels 1221. The first radial channel 12221 and the second radial channel 12222 may be arranged at the inner end surface 121 at intervals along the circumferential direction Z of the axial flux motor 1, such that the first radial channel 12221 and the second radial channel 12222 may communicate with the circumferential channels 1221 at different positions of the inner end surface 121, respectively. The first radial channel 12221 is configured to receive the coolant and allow the coolant to inflow in an extension direction of the first radial channel 12221. During the inflow of the coolant, the coolant flows sequentially into the circumferential channels 1221 at different radial positions and flows in extension directions of the circumferential channels 1221, to exchange heat with the stator assembly 20. After the coolant exchanges heat with the stator assembly 20, the coolants flowing along the circumferential channels 1221 flows further into the second radial channel 12222, and are converged along the second radial channel 12222. The coolants are converged along the second radial channel 12222 and then flow out of the housing 10, and are recirculated to the first radial channel 12221 after heat exchange with an external heat exchange element, thereby improving the cooling efficiency to the stator assembly 20.

A liquid inlet 13 and a liquid outlet 14 may be formed at the housing 10 to allow the coolant, subsequent to heat exchange, to flow out of the housing 10 and allow the coolant that is not subjected to heat exchange to flow into the housing 10. In an exemplary embodiment of the present disclosure, the first radial channel 12221 and the second radial channel 12222 are oppositely arranged in the radial direction Y, and the housing 10 further has the liquid inlet 13 for communicating the first radial channel 12221 with the outside of the housing 10 and the liquid outlet 14 for communicating the second radial channel 12222 with the outside of the housing 10. As shown in FIGS. 3 and 4, the liquid inlet 13 may be located at an end of the first radial channel 12221 away from the center of the inner end surface 121, and the liquid outlet 14 may be located at an end of the second radial channel 12222 away from the center of the inner end surface 121. When the coolant enters the housing 10 through the liquid inlet 13 and flows in the first radial channel 12221, the coolant is firstly distributed to one of the circumferential channels 1221 with the largest diameter, and is then distributed successively to other ones of the circumferential channels 1221 with gradually decreasing diameters. Although a path of a circumferential channel 1221 with a relatively large diameter is relatively long, a pressure applied to the coolant is relatively high, such that the above embodiment can make time differences among times when the coolants in different circumferential channels 1221 flow to the second radial channel 12222 as short as possible, thereby efficiently and fully cooling the stator assembly 20. Similarly, the liquid outlet 14 may be located at the end of the second radial channel 12222 away from the center of the inner end surface 121, such that two ends of the circumferential channel 1221 having a relatively large diameter have a relatively high pressure difference therebetween, thereby minimizing the time differences among times when the coolants in different circumferential channels 1221 flow to the second radial channel 12222.

In an embodiment, the inner end surface 121 is provided with a first cylindrical portion 15 and at least two annular ribs 17 surrounding the first cylindrical portion 15. The first cylindrical portion 15 is configured to receive a bearing, and the annular ribs 17 and the first cylindrical portion 15 are integrally formed with the inner end surface 121. The first cylindrical portion 15 and the annular ribs 17 both protrude from the inner end surface 121 to form the cooling channel 122 at the inner end surface 121. In an exemplary embodiment of the present disclosure, the at least two annular ribs 17 are spaced apart from the first cylindrical portion 15 in the radial direction Y, and are spaced apart from each other in the radial direction Y, such that the circumferential channels 1221 are formed between the first cylindrical portion 15 and the adjacent annular ribs 17 and between two adjacent annular ribs 17. The annular ribs 17 and the first cylindrical portion 15 may be configured to guide the coolants in the circumferential channel s 1221 to flow, and a width of an outermost annular rib of the annular ribs 17 may be greater than those of the other annular ribs 17, to enhance the structural strength of the inner end surface 121 and to facilitate assembly of the housing 10 with other structures using the outermost annular rib 17. At least some of the annular ribs 17 have notches to form radial channels 1222. The engagement among the first cylindrical portion 15, the annular ribs 17, and the notches can reduce the processing difficulty of the cooling channel.

Referring to FIGS. 1 to 4, the inner end surface 121 further has mounting blind holes 123, and the stator assembly 20 is fixed to the end plate portion 12 by fixing members inserted into the mounting blind holes 123. In this case, the mounting blind holes 123 open towards the stator assembly 20, and the fixing members are inserted into the mounting blind holes 123 from the inside of the housing 10. In this way, the risk of coolant leakage can be effectively reduced. In another exemplary embodiment of the present disclosure, the inner end surface 121 has a plurality of the mounting blind holes 123. The plurality of mounting blind holes 123 is arranged at intervals along the circumferential direction Z of the axial flux motor 1, and may be located at an edge of the end plate portion 12. Accordingly, the number of the fixing members may be in a one-to-one correspondence with the number of the mounting blind holes 123 to improve stability of the mounting of the housing 10 and the stator assembly 20.

Further, the end plate portion 12 further has an outer end surface 124 opposite to the inner end surface 121. Columnar portions 1241 protrude from the outer end surface 124, and the mounting blind holes 123 extend into the columnar portions 1241. The outer end surface 124 is located outside the accommodating space 11. The columnar portions 1241 may be arranged in one-to-one correspondence with the mounting blind holes 123. Each of the mounting blind hole 123 extends into one of the columnar portions 1241, such that the depth of the mounting blind hole 123 is increased. When the fixing member is inserted into the mounting blind hole 123, the fixing member is fixed simultaneously by the end plate portion 12 and the columnar portion 1241, to further improve the stability of the mounting of the housing 10 and the stator assembly 20.

In another exemplary embodiment of the present disclosure, the mounting blind holes 123 are disposed at the outermost annular rib 17 of the at least two annular ribs 17. In this case, the mounting blind holes 123 are located at the edge of the end plate portion 12, and the direct contact of the coolant in the cooling channel 122 with the stator assembly 20 is not affected while the fixing members are inserted into the mounting blind holes 123 for fixing.

In another exemplary embodiment of the present disclosure, the width of the outermost annular rib 17 in the radial direction Y is greater than the widths of the remaining annular ribs 17 in the radial direction Y. The structural strength of the inner end surface 121 can be enhanced by increasing the width of the outermost annular rib 17, to facilitate forming of the mounting blind holes 123 in the outermost annular rib 17 and to facilitate assembly between the housing 10 and the stator assembly 20 using the outermost annular rib 17.

In an embodiment, the stator assembly 20 includes a stator iron core 21 and a coil. The coil is wound around the stator iron core 21, which is of a ring shape. The coil protrudes from two opposite ring side surfaces of the stator iron core 21 along the radial direction Y of the axial flux motor 1 to form an inner ring coil portion 212 and an outer ring coil portion 211. That is, a part of the coil may protrude from an inner ring surface of the stator iron core 21 to form the inner ring coil portion 212, and another part of the coil may protrude from an outer ring surface of the stator iron core 21 to form the outer ring coil portion 211. The coolant flowing in the cooling channel 122 or the coolant flowing into or out of the cooling channel 122 is in direct contact with at least one of the inner ring coil portion 212 and the outer ring coil portion 211. Since the coil protrudes from the stator iron core 21 to form the outer ring coil portion 211 and the inner ring coil portion 212, when the coolant flows in the cooling channel 122, the coolant may be in direct contact with not only the stator iron core 21 but also the outer ring coil portion 211 and/or the inner ring coil portion 212, such that the cooling efficiency to the stator assembly 20 can be improved. Further, the coolant in the cooling channel 122 may be in direct contact with the stator iron core 21, and the coolant flowing into or out of the cooling channel 122 is in direct contact with the outer ring coil portion 211 and/or the inner ring coil portion 212.

In an embodiment, the stator assembly 20 includes a stator flange 22, and the stator iron core 21 is attached and fixed to a main surface of the disc-shaped body 221 of the stator flange 22 at a side. The stator flange 22 may be fixedly connected to the stator iron core 21, and the stator iron core 21 may be connected to the housing 10 by the stator flange 22, thereby reducing the assembly difficulty of the stator assembly 20. At least one of the inner ring coil portion 212 and the outer ring coil portion 211 extends beyond the disc-shaped body 221 in the radial direction Y or maintains a predetermined gap with the disc-shaped body 221 in the axial direction X. In another exemplary embodiment of the present disclosure, the inner ring coil portion 212 or the outer ring coil portion 211 extends beyond the disc-shaped body 221 in the radial direction Y, or the inner ring coil portion 212 and the outer ring coil portion 211 both extend beyond the disc-shaped body 221 in the radial direction Y. In a further exemplary embodiment of the present disclosure, the inner ring coil portion 212 and/or the outer ring coil portion 211 maintain a predetermined gap with the disc-shaped body 221 in the axial direction X. In this way, the coolant may be brought into direct contact with the inner ring coil portion 212 and/or the outer ring coil portion 211 through the predetermined gap, such that the contact area of the coolant with the inner ring coil portion 212 and/or the outer ring coil portion 211 is increased, thereby improving the cooling effect.

In some exemplary embodiments of the present disclosure, the stator iron core 21 is attached and fixed to a main surface of the disc-shaped body 221 of the stator flange 22 at a side. The disc-shaped body 221 covers at least part of the cooling channel 122, and the coolant flowing in the cooling channel 122 is in direct contact with the disc-shaped body 221. Therefore, the stator flange 22 is used to fix the stator iron core 21, and the stator flange 22 is used as a basis for engagement with the housing 10, thereby reducing the assembly difficulty. The stator flange 22 may be fixedly connected to the stator iron core 21, and the stator iron core 21 may be connected to the housing 10 by the stator flange 22, thereby reducing the difficulty in manufacturing the stator assembly 20 and the difficulty in assembling the stator assembly 20 with the housing 10.

In the present embodiment, the housing 10 further includes a second cylindrical portion 16 and two end plate portions (i.e., a first end plate portion and a second first end plate portion) that block two end openings of the second cylindrical portion 16, to form the accommodating space 11 by the engagement between the two end plate portions and the second cylindrical portion 16. The stator assembly 20 and the rotor assembly 30 are arranged between the two end plate portions in the axial direction X. The inner end surfaces are also two end surfaces (i.e., a first inner end surface and a second end surface) that respectively corresponding to the two end plate portions, and the cooling channel 122 is disposed at at least one of the two inner end surfaces adjacent to the stator assembly 20. In an exemplary embodiment of the present disclosure, in the single stator structure as shown in FIGS. 1 to 4, the cooling channel 122 is disposed at the inner end surface 12. In a dual stator structure described below, the two inner end surfaces each may have a cooling channel 122.

In the above embodiment, the housing 10 has the cooling channel 122, such that the coolant flowing in the cooling channel 122 may be brought into direct contact with the stator assembly 20 to efficiently exchange heat with the stator assembly 20, thereby improving the cooling efficiency of the axial flux motor 1.

As further shown in FIGS. 1 and 2, the axial flux motor 1 further includes a partition assembly 40. The partition assembly 40 includes a partition body 42 provided between the stator assembly 20 and the rotor assembly 30. The housing 10 cooperates with the partition body 42 to form a cooling space 41 for accommodating a coolant and the stator assembly 20, and the coolant in the cooling space 41 is in direct contact with the stator assembly 20. The partition body 42 may abut against a part of the inner peripheral surface of the housing 10 to divide the accommodating space 11 into at least two spaces, one of which is the cooling space 41 for accommodating the coolant and the stator assembly 20 and another one of which is used to accommodate the rotor assembly 30. The coolant may be stored in the cooling space 41, and the coolant in the cooling space 41 is in direct contact with the stator assembly 20, such that the partition body 42 is disposed between the stator assembly 20 and the rotor assembly 30, and the structure of the axial flux motor 1 may be more compact by properly utilizing the inner space of the housing 10. Furthermore, the housing 10 cooperates with the partition body 42 to form the cooling space 41, and the coolant is in direct contact with the stator assembly 20, such that the heat exchange between the coolant and the stator assembly 20 can be efficiently achieved, and the cooling efficiency to the stator assembly 20 can be improved.

In another exemplary embodiment of the present disclosure, the housing 10 includes the end plate portion 12, and the inner end surface 121 of the end plate portion 12 is arranged at a side of the stator assembly 20 facing away from the rotor assembly 30. The inner end surface 121 of the end plate portion 12 is spaced apart from the partition body 42 in the axial direction X to define two side boundaries of the cooling space 41 in the axial direction X. Thus, by defining the boundaries of the cooling space 41 by the end plate portion 12 and the partition body 42, it is possible to improve the utilization rate of the accommodating space 11 of the housing 10 and to make the structure of the entire axial flux motor 1 more compact.

In another exemplary embodiment of the present disclosure, the housing 10 includes two cylindrical portions arranged in a sleeved manner in the radial direction Y of the axial flux motor 1, the two cylindrical portions are respectively sealingly engaged with the partition body 42, and the cooling space 41 is of a ring shape. Thus, the stator assembly 20 may be sealed in the cooling space 41 with a relatively simple structure, reducing the risk of coolant leakage. In particular, since the stator assembly 20 generally employs an annular arrangement to ensure the passage of the rotary shaft of the rotor assembly 30, the annular cooling space 41 is used to accommodate the stator assembly 20, such that a cylindrical space may be formed inside the annular cooling space 41 for placing a bearing and allowing insertion of the rotary shaft of the rotor assembly 30. Since the cylindrical space and the annular cooling space 41 are isolated from each other, the coolant in the cooling space 41 does not enter the cylindrical space and affect the rotor assembly 30 during cooling of the stator assembly 20.

In a specific embodiment, the two cylindrical portions include the first cylindrical portion 15 and the second cylindrical portion 16 arranged around the first cylindrical portion 15. The first cylindrical portion 15 and the second cylindrical portion 16 extend towards the stator assembly 20, and the first cylindrical portion 15 allows the rotary shaft of the rotor assembly 30 to pass therethrough. The partition body 42 includes an inner ring matching portion 421 and an outer ring matching portion 422 arranged around the inner ring matching portion 421. The inner ring matching portion 421 is sealingly engaged with the first cylindrical portion 15, and the outer ring matching portion 422 is sealingly engaged with the second cylindrical portion 16. The first cylindrical portion 15 and the second cylindrical portion 16 may be arranged coaxially. The first cylindrical portion 15 may engage with the inner ring matching portion 421 to achieve sealing engagement between the inner ring matching portion 421 and the first cylindrical portion 15. The second cylindrical portion 16 may engage with the outer ring matching portion 422 to achieve sealing engagement between the outer ring matching portion 422 and the second cylindrical portion 16, thereby forming the cooling space 41 of a ring shape between the first cylindrical portion 15 and the second cylindrical portion 16. Thus, the stator assembly 20 may be sealed in the cooling space 41 with a relatively simple structure, reducing the risk of coolant leakage.

In another exemplary embodiment of the present disclosure, the inner ring matching portion 421 and/or the outer ring matching portion 422 is sealingly engaged with the stator assembly 20 to seal the stator assembly 20 into the cooling space 41. Thus, the sealing of the cooling space 41 can be enhanced.

In another exemplary embodiment of the present disclosure, the rotary shaft of the rotor assembly 30 is rotatably supported within the first cylindrical portion 15, which at least partially overlaps the stator assembly 20 in the axial direction X. The rotary shaft of the rotor assembly 30 extends into the first cylindrical portion 15 in the axial direction X, and is rotatably supported in the first cylindrical portion 15. The first cylindrical portion 15 and the stator assembly 20 at least partially overlap with each other in the axial direction X, such that a dimension of the axial flux motor 1 in the axial direction X can be reduced and the structure of the entire axial flux motor 1 is more compact.

Figure 5:
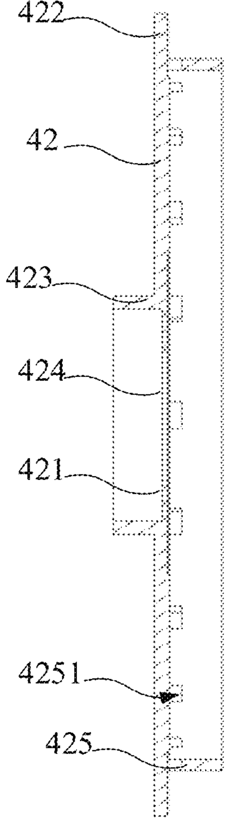
FIG. 5 is a schematic sectional view of a partition assembly according to a first embodiment of the present disclosure.

Referring to FIG. 5, it is a schematic sectional view of a partition assembly according to a first embodiment of the present disclosure.

In an embodiment, the partition body 42 is embedded in the interior of the second cylindrical portion 16, and sealing engagement is formed between an outer peripheral surface of the outer ring-matching portion 422 and an inner peripheral surface of the second cylindrical portion 16, thereby allowing the partition body 42 to be placed in the accommodating space 11 to provide good protection to the partition body 42 while forming the cooling space 41. In another exemplary embodiment of the present disclosure, a third cylindrical portion 423 is provided at the inner ring matching portion 421. The third cylindrical portion 423 and the first cylindrical portion 15 are connected in an insertion manner to form sealing engagement therebetween, and better alignment and sealing effect are achieved by the insertion engagement between the third cylindrical portion 423 and the first cylindrical portion 421.

The third cylindrical portion 423, the second cylindrical portion 16, and the first cylindrical portion 15 may be arranged coaxially, and a dimension of the third cylindrical portion 423 in the radial direction Y is not equal to a dimension of the first cylindrical portion 15 in the radial direction Y. The third cylindrical portion 423 and the first cylindrical portion 15 are engaged with each other in an insertion manner in the axial direction X. An outer peripheral surface of the third cylindrical portion 423 may be attached to an inner peripheral surface of the first cylindrical portion 15, or an inner peripheral surface of the third cylindrical portion 423 may be attached to an outer peripheral surface of the first cylindrical portion 15, such that the third cylindrical portion 423 is limited by the first cylindrical portion 15 in the radial direction Y. Meanwhile, a side of the first cylindrical portion 15 facing towards the inner ring matching portion 421 may engage with the inner ring matching portion 421 to limit the partition body 42 in the axial direction X, to fix the partition body 42 in the housing 10.

In another exemplary embodiment of the present disclosure, the third cylindrical portion 423 is attached to an outer periphery of the first cylindrical portion 15. The dimension of the third cylindrical portion 423 in the radial direction Y may be greater than the dimension of the first cylindrical portion 15 in the radial direction Y. The first cylindrical portion 15 is inserted into the third cylindrical portion 423, and the inner peripheral surface of the third cylindrical portion 423 is arranged to engage with the outer peripheral surface of the first cylindrical portion 15 to form a space for mounting a bearing in the first cylindrical portion 15 while defining the partition body 42 in the housing 10. The axial flux motor 1 further includes a bearing provided within the first cylindrical portion 15, and the bearing may be connected to the rotor assembly 30. In this case, the housing 10 may be made of a metal material to provide a relatively strong structural strength. The partition body 42 may be made of a lightweight material such as plastic or silicone, to provide a better sealing effect while reducing the overall weight of the axial flux motor 1.

The partition body 42 includes an oil collection plate 424, which is engaged with the first cylindrical portion 15 to form an oil reservoir 4241. A lubricant oil in the oil reservoir 4241 is used to lubricate the bearing. The oil collection plate 424 may be located at the inner ring matching portion 421, or may be separated with respect to the inner ring matching portion 421. After the bearing is placed in the first cylindrical portion 15, the bearing and the oil collection plate 424 overlap with each other in the radial direction Y, and are in a clearance fit in the axial direction X, thereby forming the oil reservoir 4241. The oil reservoir 4241 is used for storing the lubricant oil, and the lubricant oil may be used to ensure the lubrication of the bearing to be continuous and stable.

In another exemplary embodiment of the present disclosure, the oil collection plate 424 is connected to the third cylindrical portion 423, and extends towards the inside of the third cylindrical portion 423 in the radial direction Y of the axial flux motor 1. Thus, when the third cylindrical portion 423 is inserted in place with respect to the first cylindrical portion 15, the oil collection plate 424 can cooperate with the first cylindrical portion 15 to form the oil reservoir 4241, such that the assembly process of the oil collection plate 424 can be simplified and the structural strength of the partition body 42 can be enhanced by the oil collection plate 424.

In an embodiment, the partition assembly 40 includes a reinforcement member 425 of a cylindrical shape, and the reinforcement member 425 is supported on a side of the partition body 42 facing away from the stator assembly 20. The rotor assembly 30 is disposed in the reinforcement member 425. In another exemplary embodiment of the present disclosure, the cylindrical reinforcement member 425 may be arranged coaxially with the partition body 42 and connected to the outer ring matching portion 422. The partition body 42 is supported by the reinforcement member 425, to alleviate unnecessary deformation of the partition body 42 during the assembly of the housing 10 and improve the structural stability of the partition body 42.

In another exemplary embodiment of the present disclosure, the reinforcement member 425 is engaged with the housing 10. For example, in FIG. 2, the reinforcement member 425 is abutted with another inner end surface opposite to the inner end surface 121. In other embodiments, the reinforcement member 425 may engage with the second cylindrical portion 16. Thus, the structural stability of the partition body 42 can be further improved by the supporting force of the housing 10 on the reinforcement member 425.

In the embodiment of the present disclosure, the stator assembly 20 includes the stator iron core 21 of a ring shape and the coil wound around the stator iron core 21. The coil protrudes from two opposite ring side surfaces of the stator iron core 21 along the radial direction Y of the axial flux motor 1. That is, a part of the coil may protrude from an inner ring of the stator iron core 21 to form the inner ring coil portion 212, and another part of the coil may protrude from an outer ring of the stator iron core 21 to form the outer ring coil portion 211. The inner ring coil portion 212 and/or the outer ring coil portion 211 are located in the cooling space 41, and the coolant in the cooling space 41 is in direct contact with the inner ring coil portion 212 and/or the outer ring coil portion 211, thus the cooling efficiency to the stator assembly 20 can be improved.

Further, as described above, when the stator iron core 21 is fixed by the stator flange 22, at least one of the inner ring coil portion 212 and the outer ring coil portion 211 may be arranged to extend beyond the disc-shaped body 221 in the radial direction Y or maintain a predetermined gap with the disc-shaped body 221 in the axial direction X, thereby obtaining a better cooling effect.

Figure 6:
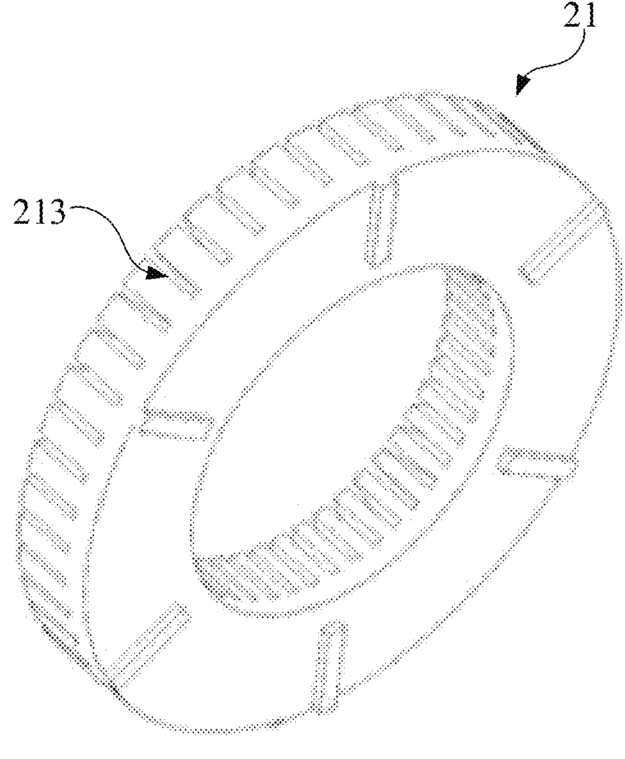
FIG. 6 is a schematic structural view of a stator assembly according to an embodiment of the present disclosure.
Figures 7, 8:
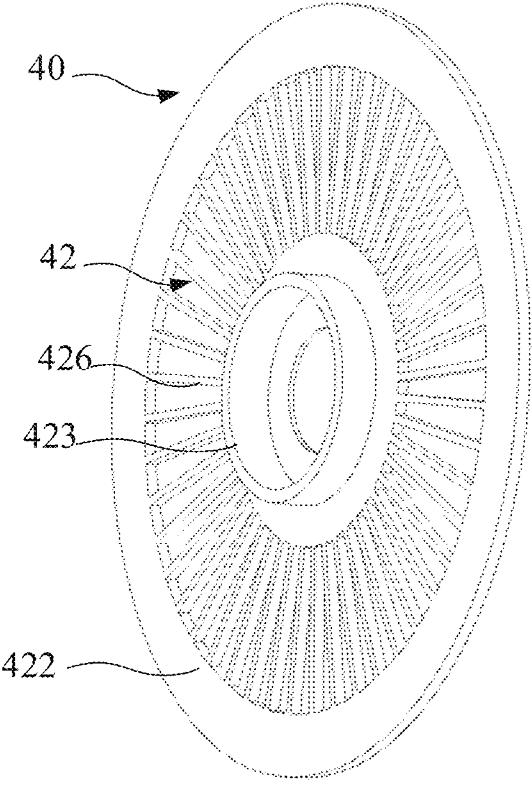
FIG. 7 is a schematic structural view of a partition assembly according to a second embodiment of the present disclosure.
FIG. 8 is a schematic sectional view of the partition assembly according to the second embodiment of the present disclosure.

Referring to FIGS. 6 to 8, FIG. 6 is a schematic structural view of a stator assembly according to an embodiment of the present disclosure, FIG. 7 is a schematic structural view of a partition assembly according to a second embodiment of the present disclosure, and FIG. 8 is a schematic sectional view of the partition assembly according to the second embodiment of the present disclosure.

The stator assembly 20 includes a stator iron core 21 and a coil wound around the stator iron core 21. The stator iron core 21 has a plurality of stator slots 213, and the coil is embedded in the plurality of stator slots 213. A partition body 42 includes a plurality of embedded ribs 426, which is positioned in one-to-one correspondence with the plurality of stator slots 213. Each of the plurality of embedded ribs 426 is embedded in a corresponding one of the plurality of stator slots 213. The number of the stator slots 213 and the number of the embedded ribs 426 may be in a one-to-one correspondence. When the embedded ribs 426 are respectively embedded in the corresponding stator slots 213, the coil in the stator slots 213 can be effectively fixed by direct contact of the coil with the embedded ribs 426. When the partition body 42 is made of a highly thermal-conductivity material, as a coolant is contained in the cooling space 41, the coolant may contact the partition body 42 to lower the temperature of the partition body 42, thereby cooling the coil in the stator slots 213 by the embedded ribs 426 of the partition body 42. In other embodiments, the embedded ribs 426 may be spaced apart from the coil in the stator slots 213 to ensure that the coil cannot disengage from the stator slots 213.

Further, the plurality of stator slots 213 and the plurality of embedded ribs 426 are radially spread with respect to the axial direction X, respectively. In this way, more stator slots 213 and embedded ribs 426 are provided in a limited space, and the plurality of embedded ribs 426 are connected to the inner ring matching portion 421 and/or the outer ring matching portion 422, respectively. Thus, the assembling process of the embedded ribs 426 can be simplified, and the inner ring matching portion 421 and/or the outer ring matching portion 422 can be fixed with the embedded ribs 426 to improve the structural stability. When the inner ring matching portion 421 is sealingly engaged with the first cylindrical portion 15 or the outer ring matching portion 422 is sealingly engaged with the second cylindrical portion 16, the embedded ribs 426 connected to the inner ring matching portion 421 and/or the outer ring matching portion 422 are simultaneously inserted into the stator slots 213, such that the assembly manner is more convenient. Since the stator slots 213 and the embedded ribs 426 are radially spread, the number of the stator slots 213 and the embedded ribs 426 can be increased to make the contact area of the partition body 42 with the stator iron core 21 and the coil larger, thereby further increasing the cooling effect of the coolant to the stator assembly 20.

Further, because the stator slots 213 and the embedded ribs 426 spread radially, the embedded ribs 426 can provide good circumferential and radial positioning of the connected inner ring matching portion 421 and/or the outer ring matching portion 422, and may also provide good axial positioning of the connected inner ring matching portion 421 and/or the outer ring matching portion 422 when the embedded ribs 426 are secured within the stator slots 213 in an insertion manner or other manner.

In another exemplary embodiment of the present disclosure, no filling is performed among the plurality of embedded ribs 426, i.e., the plurality of embedded ribs 426 are arranged in a hollow pattern. The hollowed pattern advantageously reduces the width of the air gap between the partition body 42 and the rotor assembly 30, and makes the structure of the entire axial flux motor 1 more compact.

In another exemplary embodiment of the present disclosure, the partition body 42 further includes a blocking plate 427, which is configured to block the gaps among the plurality of embedded ribs 426 and located on a side of the embedded ribs 426 facing away from the stator slot 213. The blocking plate 427 may be an integral plate, and the gaps among the plurality of embedded ribs 426 may be blocked by the blocking plate 427. Therefore, the sealing of the cooling space 41 can be enhanced by the blocking plate 427, making it difficult for the coolant to leak from the cooling space 41.

It should be noted that as described above, the housing 10 includes the end plate portion 12, the inner end surface 121 of which is disposed towards the side of the stator assembly 20 facing away from the rotor assembly 30. The inner end surface 121 of the end plate portion 12 has the cooling channel 122 along which the coolant in the cooling space 41 flows. The stator assembly 20 covers at least part of the cooling channel 122, and the coolant flowing in the cooling channel 122 is in direct contact with the stator assembly 20. The stator assembly 20 includes the stator flange 22 and the stator iron core 21, and the stator flange 22 includes the disc-shaped body 221. The stator iron core 21 is attached and fixed to a main surface of the disc-shaped body 221 facing away from the end plate portion 12, the disc-shaped body 221 covers at least part of the cooling channel 122, and the coolant flowing in the cooling channel 122 is in direct contact with the disc-shaped body 221.

Further, at least one of the inner ring coil portion 212 and the outer ring coil portion 211 extends beyond the disc-shaped body 221 in the radial direction Y of the axial flux motor 1 or maintains a predetermined gap with the disc-shaped body 221 in the axial direction X of the axial flux motor 1. The coolant is in direct contact with at least one of the inner ring coil portion 212 and the outer ring coil portion 211.

Furthermore, the cooling channel 122 includes at least two circumferential channels 1221 spaced apart from each other in the radial direction Y of the axial flux motor 1, and at least one radial channel 1222 arranged in the radial direction Y of the axial flux motor 1 and in communication with the at least two circumferential channels 1221.

In other embodiments, similar cooling channels may be formed on a side of the partition body 42 towards the end plate portion 12 and/or at the stator assembly 20 to allow the coolant to flow therethrough.

In other embodiments, the partition assembly 40 may be eliminated, and the stator assembly 20 cooperates with the inner end surface 121 of the end plate portion 12 to form an enclosed cooling space.

In the embodiments described above, the description is mainly based on a single stator structure, i.e., the stator assembly includes only one stator component. In some other feasible embodiments of the present disclosure, the partition assembly 40 described above is also applicable to a dual stator structure. That is, the stator assembly includes two stator components spaced apart from each other along the axial direction X, and the rotor assembly is located between the two stator components, such that the stability and the output efficiency of the axial flux motor 1 is improved through the two stator components.

Figure 9:
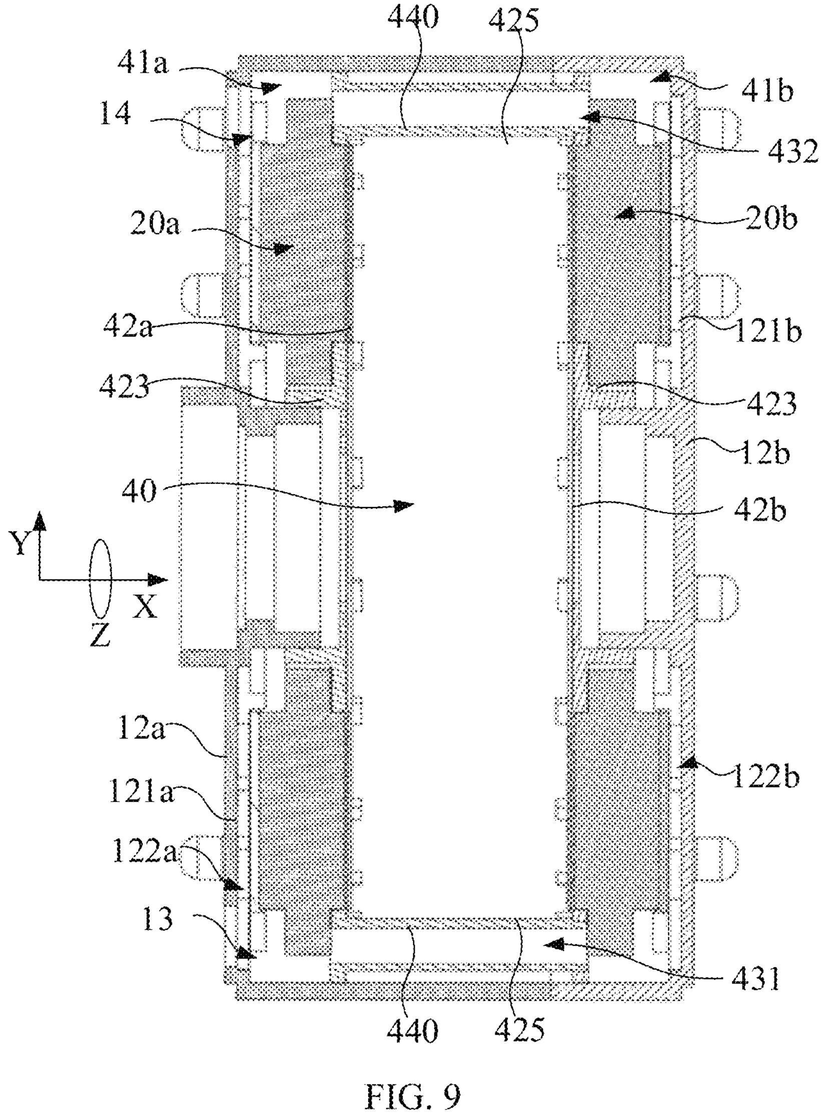
FIG. 9 is a schematic sectional view of an axial flux motor without a rotor assembly according to a second embodiment of the present disclosure.
Figure 10:
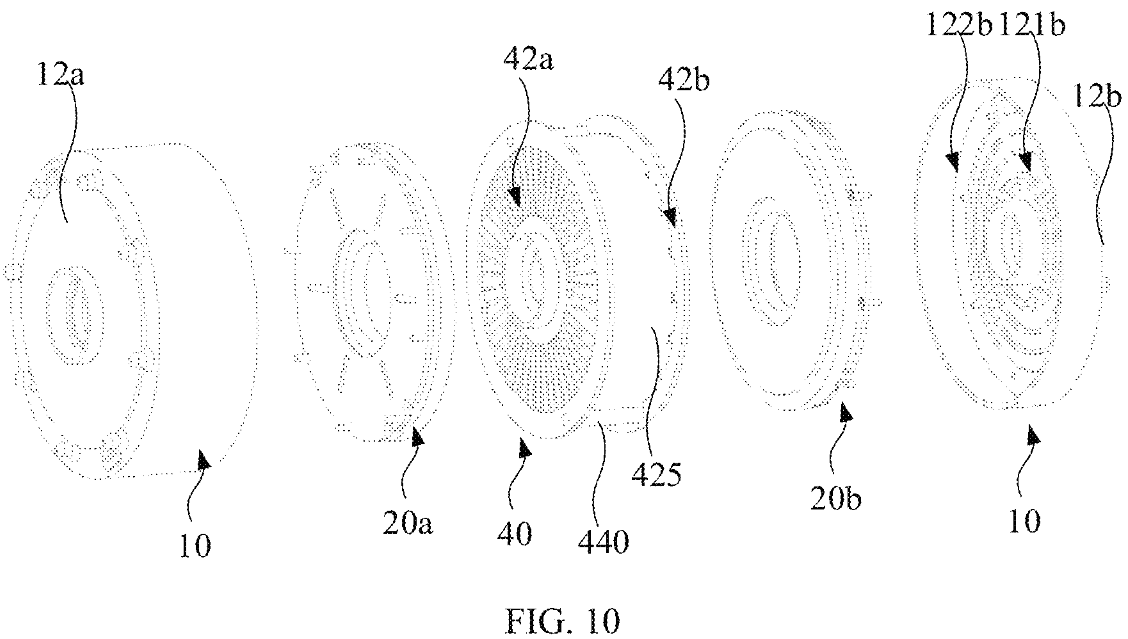
FIG. 10 is a schematic exploded view of the axial flux motor according to the second embodiment of the present disclosure.
Figure 11:
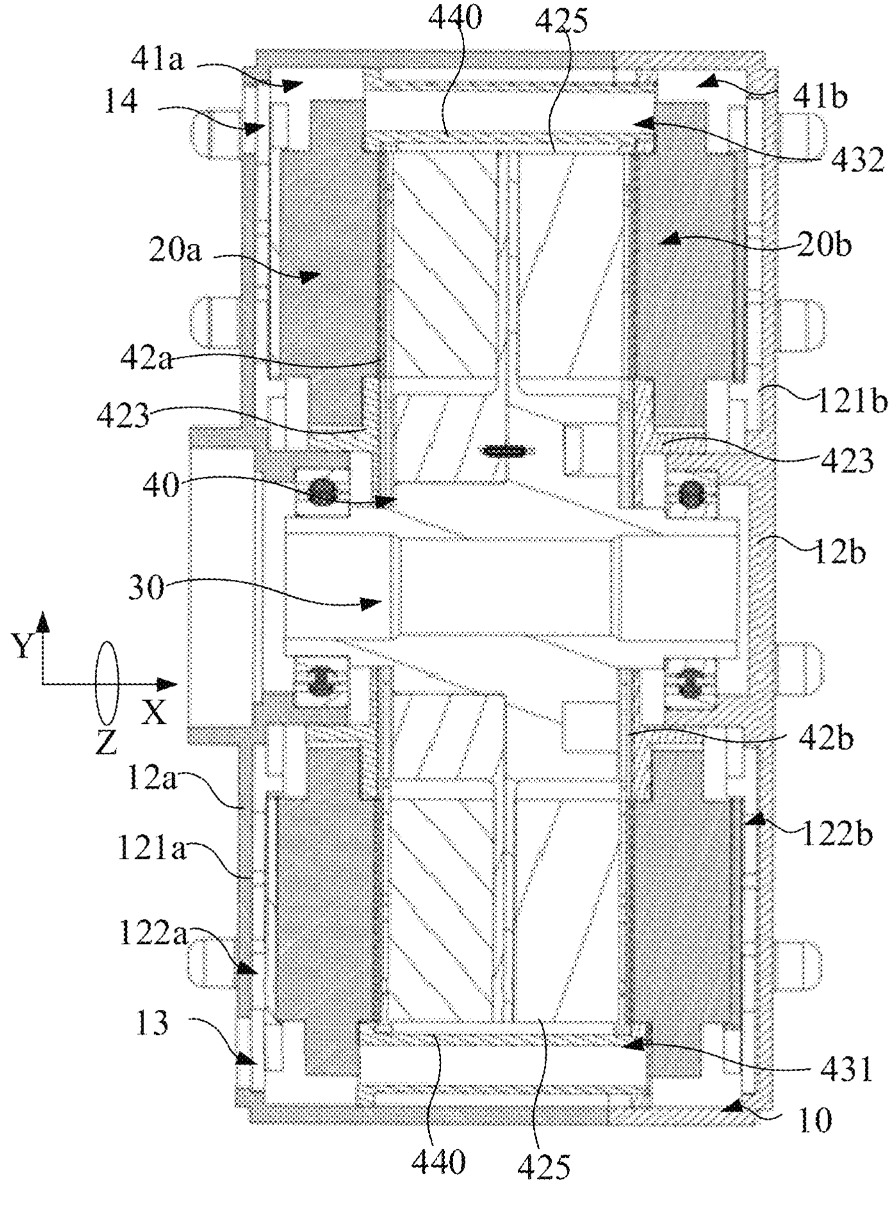
FIG. 11 is a schematic sectional view of the axial flux motor according to the second embodiment of the present disclosure.

Referring to FIGS. 9 to 11, FIG. 9 is a schematic sectional view of an axial flux motor without a rotor assembly according to a second embodiment of the present disclosure, FIG. 10 is a schematic exploded view of the axial flux motor according to the second embodiment of the present disclosure, and FIG. 11 is a schematic sectional view of the axial flux motor according to the second embodiment of the present disclosure.

A stator assembly 20 includes a first stator component 20*a* and a second stator component 20*b* spaced apart from each other in the axial direction X, and a rotor assembly 30 is provided between the first stator component 20*a* and the second stator component 20*b*. That is, in the present embodiment, the axial flux motor 1 may be a dual-stator axial flux motor 1, and the stability and the output efficiency of the axial flux motor 1 and the integration of the axial flux motor 1 are improved by the two stator components. The rotor assembly 30 may include one or two rotor components. When the rotor assembly 30 includes two rotor components, the two rotor components may be connected by a rotary shaft, one of the two rotor components corresponds to the first stator component 20*a*, and another one of the two rotor components corresponds to the second stator components 20*b*. The first stator component 20*a*, the two rotor components, and the second stator component 20*b* may be sequentially arranged along the axial direction X of the axial flux motor 1, thereby improving the integration degree of the axial flux motor 1.

Further, the axial flux motor 1 includes a partition assembly 40, and the partition assembly 40 includes a first partition body 42*a* and a second partition body 42*b*. The first partition body 42*a* cooperates with the housing 10 to form a first cooling space 41*a* for accommodating a coolant and the first stator component 20*a*, and the second partition body 42*b* cooperates with the housing 10 to form a second cooling space 41*b* for accommodating a coolant and the second stator component 20*b*. The coolant in the first cooling space 41*a* may be in direct contact with the first stator component 20*a* in the first cooling space 41*a*, and the coolant in the second cooling space 41*b* may be in direct contact with the second stator component 20*b* in the second cooling space 41*b*, thereby efficiently allowing heat exchange to be performed between the coolant and the first stator component 20*a* and between the coolant and the second stator component 20*b*, improving the cooling efficiency to the stator assembly 20.

In an exemplary embodiment of the present disclosure, in order to rapidly cool the first stator component 20*a* and the second stator component 20*b*, the housing 10 includes a first end plate portion 12*a* and a second end plate portion 12*b*. The first end plate portion 12*a* includes a first inner end surface 121*a*, and the second end plate portion 12*b* includes a second inner end surface 121*b*. The first inner end surface 121*a* is disposed towards the first stator component 20*a*, and the second inner end surface 121*b* is disposed towards the second stator component 20*b*. A first cooling channel 122*a* may be formed at the first inner end surface 121*a*, and a second cooling channel 122*b* may be formed at the second inner end surface 121*b*. The first cooling channel 122*a* may be arranged to allow the coolant flowing in the first cooling channel 122*a* to be in direct contact with the first stator component 20*a*, and the second cooling channel 122*b* may be arranged to allow the coolant flowing in the second cooling channel 122*b* to be in direct contact with the second stator component 20*b*, thereby allowing the coolant to be in direct contact with the first stator component 20*a* and the second stator component 20*b*, and allowing the coolant to perform heat exchange with the first stator component 20*a* and the second stator component 20*b* with high efficiency to improve the cooling efficiency to the stator assembly 20.

The first stator component 20*a* is located between the first inner end surface 121*a* and the first partition body 42*a*, and the first partition body 42*a* cooperates with the first inner end surface 121*a* to form the first cooling space 41*a* for accommodating the coolant and the first stator component 20*a*. The second stator assembly 20*b* is located between the second inner end surface 121*b* and the second partition body 42*b*, and the second partition body 42*b* cooperates with the second inner end surface 121*b* to form the second cooling space 41*b* for accommodating the coolant and the second stator component 20*b*. The first inner end surface 121*a* may be formed with the first cooling channel 122*a*, and the second inner end surface 121*b* may be formed with the second cooling channel 122*b*, thereby efficiently allowing the coolant to perform heat exchange with the first stator component 20*a* and the second stator component 20*b* to improve the cooling efficiency to the stator assembly 20.

It should be noted that as described above, the first cooling channel 122*a* and the second cooling channel 122*b* are not necessary conditions for forming the first cooling space 41*a* and the second cooling space 41*b*, and the cooling channels may be eliminated or disposed at other corresponding positions based on actual requirements.

Further, the partition assembly 40 has communication passages for communicating the first and second cooling spaces 41*a* and 41*b*.

Furthermore, the communication passages include a first communication passage 431 and a second communication passage 432 opposite to each other in the radial direction Y. Thus, the consistency of the cooling effect of the two cooling spaces 41 can be improved. The first communication passage 431 and the second communication passage 432 may be located at an outer peripheral edge of the partition assembly 40. One of the first communication passage 431 and the second communication passage 432 may be configured to allow the coolant to flow from the first cooling space 41*a* into the second cooling space 41*b*, and another one of the first communication passage 431 and the second communication passage 432 may allow the coolant to flow from the second cooling space 41*b* into the first cooling space 41*a*. In an exemplary embodiment, the first communication passage 431 and the second communication passage 432 both communicate with the first cooling space 41*a* and the second cooling space 41*b*, the coolant may enter the second cooling space 41*b* through the first communication passage 431 after the coolant enters the first cooling space 41*a* from the outside, and the coolant may flow into the first cooling space 41*a* through the second communication passage 432 after the coolant completes heat exchange with the second stator component 20*b* in the second cooling space 41*b*, and thereafter the coolant may be transported out of the housing 10 from the first cooling space 41*a*. Thus, the consistency of the cooling effect of the two cooling spaces 41 can be improved while ensuring the cooling efficiency to the stator assembly 20. Further, it is also possible to simplify the circulation manner of the coolant.

In another exemplary embodiment of the present disclosure, the stator assembly 20 and the rotor assembly 30 are arranged between the first end plate portion 12*a* and the second end plate portion 12*b* in the axial direction X, one of the first end plate portion 12*a* and the second end plate portion 12*b* has the liquid inlet 13 and the liquid outlet 14, and the liquid inlet 13 and the liquid outlet 14 are respectively disposed opposite to the first communication passage 431 and the second communication passage 432 in the axial direction X of the axial flux motor 1. In an exemplary embodiment, taking the first end plate portion 12*a* having both the liquid inlet 13 and the liquid outlet 14 as an example, the coolant enters the first cooling space 41*a* through the liquid inlet 13. A part of the coolant flows in the first cooling space 41*a*, is in direct contact with the first stator assembly 20*a*, and performs heat exchange with the first stator component 20*a*. Thereafter this part of the coolant flows out of the first cooling space 41*a* through the liquid outlet 14. The remaining part of the coolant enters the second cooling space 41*b* through the first communication passage 431 to be in direct contact with the second stator component 20*b*, and performs heat exchange with the second stator component 20*b*. The remaining part of the coolant then flows out of the second cooling space 41*b* through the second communication passage 432 and flows to the first cooling space 41*a*, and finally flows to the outside through the liquid outlet 14. Since the liquid inlet 13 and the liquid outlet 14 are respectively arranged opposite to the first communication passage 431 and the second communication passage 432 along the axial direction X of the axial flux motor 1, the coolant flowing into the second cooling space 41*b* via the first communication passage 431 does not perform excessive heat exchange with the first stator component 20*a*, while the coolant flowing into the first cooling space 41*a* via the second communication passage 431 is merged with the coolant in the first cooling space 41*a* that has completed heat exchange with the first stator component 20*a*. Thus, it is also possible to improve the consistency of the cooling effect of the two cooling spaces 41 while ensuring the cooling efficiency to the stator assembly 20 and the rotor assembly 30.

Figure 12:
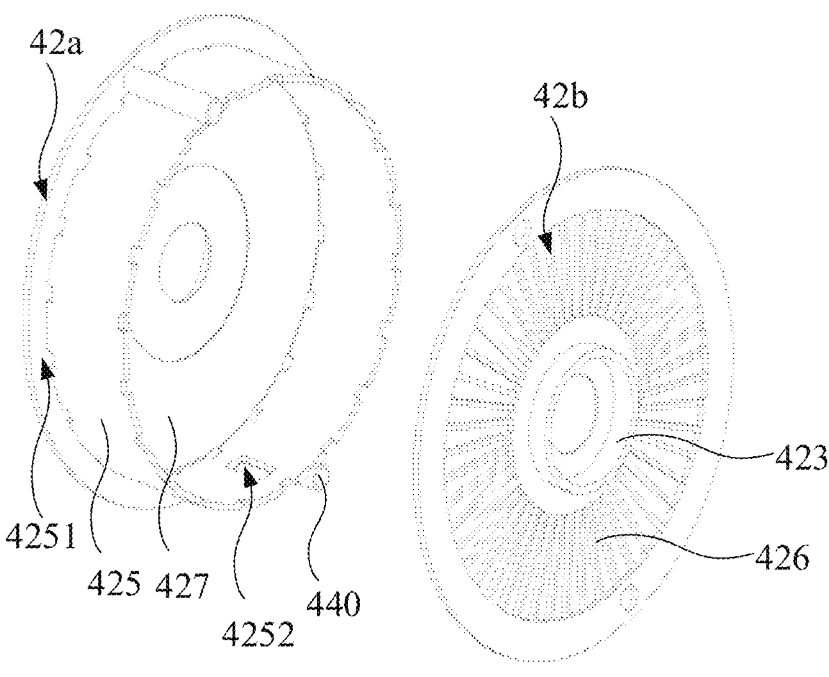
FIG. 12 is a schematic exploded view of a partition assembly of the first embodiment in the axial flux motor according to the second embodiment of the present disclosure.
Figure 13:
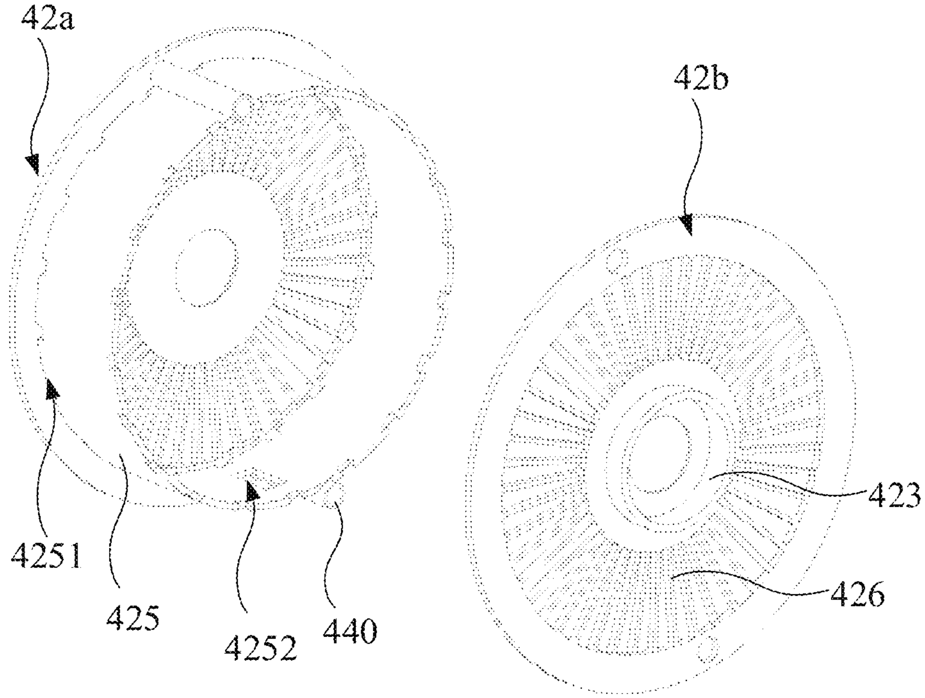
FIG. 13 is a schematic exploded view of a partition assembly of the second embodiment in the axial flux motor according to the second embodiment of the present disclosure.
Figure 14:
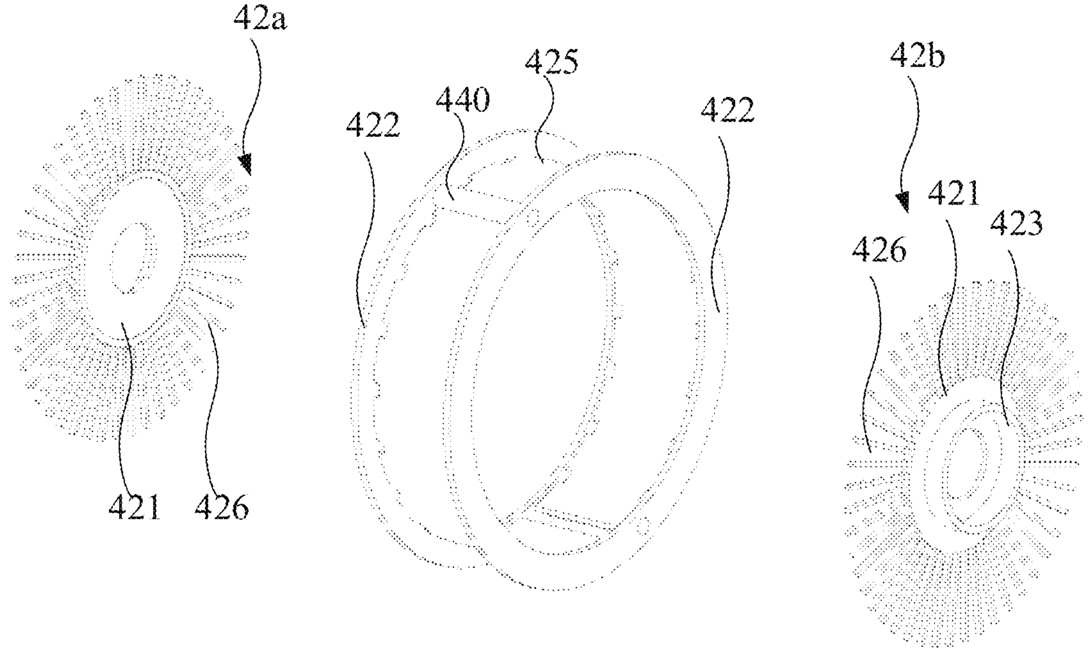
FIG. 14 is a schematic exploded view of a partition assembly of a third embodiment in the axial flux motor according to the second embodiment of the present disclosure.

Referring to FIGS. 12 to 14, FIG. 12 is a schematic exploded view of a partition assembly of the first embodiment in the axial flux motor according to the second embodiment of the present disclosure, FIG. 13 is a schematic exploded view of a partition assembly of the second embodiment in the axial flux motor according to the second embodiment of the present disclosure, and FIG. 14 is a schematic exploded view of a partition assembly of a third embodiment in the axial flux motor according to the second embodiment of the present disclosure.

In an embodiment, the partition assembly 40 further includes a reinforcing member 425 and a passage member 440 that are connected between the first and second partition bodies 42*a* and 42*b*. The reinforcing member 425 is in a cylindrical shape, and the rotor assembly 30 is disposed inside the reinforcing member 425. The passage member 440 is disposed outside the reinforcing member 425, and the communication passages are arranged at the passage member 440. Thus, the structural stability of the first partition body 42*a* and the second partition body 42*b* can be improved while avoiding interference of the communication passages with the rotor assembly 30. In addition, the passage member 440 is located outside the reinforcement member 425, and it is also possible to enlarge the flow range of the coolant in the first cooling space 41*a* and the second cooling space 41*b*, to achieve more thorough cooling of the axial flux motor 1, and to improve the consistency of the cooling effect of the two cooling spaces 41. In addition, the reinforcement member 425 and the passage member 440 are both disposed at the partition assembly 40 to increase the integration of the axial flux motor 1. In this case the passage member 440 is disposed outside the reinforcement member to further alleviate adverse effects on the rotor assembly 30 caused by the coolant leakage in the communication passages.

In an embodiment, the partition assembly 40 has a plurality of pressure relief holes 4251 formed at intervals along the circumferential direction Z of the axial flux motor 1. The pressure relief holes 4251 each may be a through hole, and the pressure relief holes 4251 are used to balance air pressure fluctuations caused by the rotor assembly 30 during operation.

In another exemplary embodiment of the present disclosure, the rotor assembly 30 is spaced apart from the partition body 42 in the axial direction X and forms an air gap therebetween, to avoid interference of the rotor assembly 30 with the partition body 42 due to vibrations in the axial direction X during operation. During operation of the rotor assembly 30, the air pressure in the air gap changes, thereby affecting the rotary performance of the rotor assembly 30. In the present embodiment, the pressure relief holes 4251 are used to communicate the air gap with an outer space of the partition assembly 40, and the pressure fluctuations in the air gap caused by the operation of the rotor assembly 30 can be balanced through the pressure relief holes 4251, to reduce the influence of the pressure fluctuations on the rotary performance of the rotor assembly 30.

In an embodiment, the partition assembly 40 further has a flow return hole 4252 that is arranged to allow the coolant permeating from the cooling space 41 into the partition assembly 40 to be discharged to the outer space of the partition assembly 40. The flow return hole 4252 may be a through hole, thereby mitigating adverse effects of the coolant leaking from the cooling space 41 on the axial flux motor 1.

In another exemplary embodiment of the present disclosure, as described above, the rotor assembly 30 is disposed inside the reinforcement member 425 such that the pressure relief holes 4251 and the flow return hole 4252 may be disposed at the reinforcement member 425. In this case, the pressure relief holes 4251 and the flow return hole 4252 communicate the inner space of the reinforcement member 425 with the outer space of the partition assembly 40.

In another exemplary embodiment of the present disclosure, the plurality of pressure relief holes 4251 is arranged at intervals at the edge of the reinforcement member 425 facing towards the partition body 42 in the circumferential direction Z of the axial flux motor 1, and the number of the pressure relief holes 4251 may be set based on actual situations. The plurality of pressure relief holes 4251 may be arranged at equal intervals in the circumferential direction Z of the axial flux motor 1, such that the air pressure in the reinforcement member 425 can be simultaneously adjusted through the plurality of pressure relief holes 4251. The flow return hole 4252 is centrally arranged with respect to two side edges of the reinforcement member 425 in the axial direction X to improve the pressure relief effect of the pressure relief holes 4251 and the backflow effect of the flow return hole 4252.

In an embodiment, when the axial direction X is defined in a horizontal direction, the flow return hole 4252 is disposed on the lower side of the reinforcement member 425 in a gravity direction, thereby allowing the coolant leaking to the reinforcement member 425 to flow out of the flow return hole 4252 under its own gravity.

It should be noted that the pressure relief holes 4251 and the flow return hole 4252 described above are also applicable to the single stator structure described above.

It should be noted that the first partition body 42*a* and the second partition body 42*b* shown in FIG. 11 may have the same structure as the partition body 42 described in FIGS. 1 to 4 and fitted to the housing 10 in the same manner, which will not be described in detail herein.

Referring to FIGS. 12 and 13, the first partition body 42*a* may be integrally formed with the reinforcement member 425 and the passage member 440, or may be pre-assembled with the reinforcement member 425 and the passage member 440 in an integral assembly structure. The second partition body 42*b* may be assembled with the integral assembly structure after the rotor assembly 30 is assembled to the reinforcement member 425.

It should be noted that the gaps among the embedded ribs 426 in FIG. 12 are blocked by the blocking plate 427, while the gaps among the embedded ribs 426 in FIG. 13 are arranged in a hollow pattern.

Referring to FIG. 14, in the present embodiment, outer ring matching portions 422 of the first and second partition bodies 42*a* and 42*b* are integrally formed with the reinforcement member 425 and the passage member 440, or are pre-assembled with the reinforcement member 425 and the passage member 440 in an integral assembly structure in a fixture manner. An inner ring matching portion 421 of the first partition body 42*a* and the embedded ribs 426 are integrally formed or pre-assembled to be fixed in an integral assembly structure, and an inner ring matching portion 421 of the second partition body 42*b* and the embedded rib 426 are integrally formed or pre-assembled to be fixed in an integral assembly structure, such that the partition assembly 40 can be easily disassembled and maintained by assembling the inner ring matching portions 421 and the embedded rib 426 to form the partition assembly 40.

With the above embodiment, the partition assembly 40 may be provided between the stator assembly 20 and the rotor assembly 30 and/or the cooling channel 122 may be formed at the housing 10. Therefore, the coolant may be in direct contact with the stator assembly 20 to efficiently perform heat exchange with the stator assembly 20 to improve the cooling efficiency of the axial flux motor 1.

Figure 15:
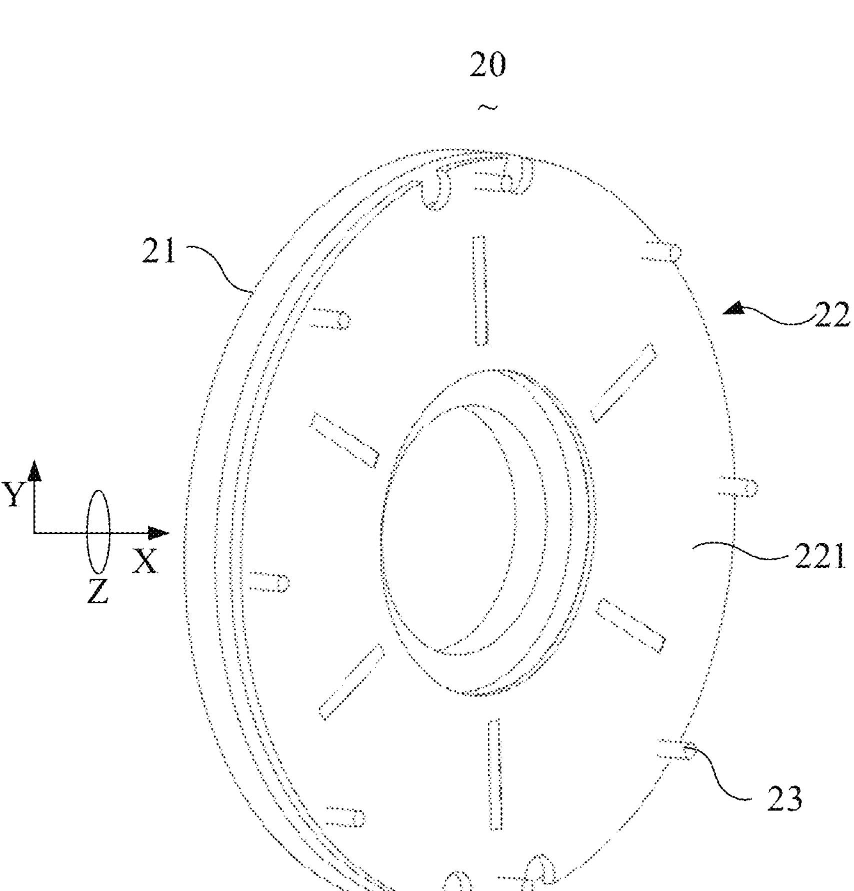
FIG. 15 is a schematic structural view of a stator assembly according to a first embodiment of the present disclosure.

In order to improve the assembly efficiency of the stator assembly, to accurately mount the stator assembly in the housing, and to facilitate direct cooling to the stator assembly with a coolant in the housing, etc., the axial flux motor of the present disclosure further includes improvement to the stator assembly. The following mainly describes the structure of the stator assembly with reference to FIG. 15. FIG. 15 is a schematic structural view of a stator assembly according to a first embodiment of the present disclosure.

The stator assembly 20 includes a stator iron core 21 and a stator flange 22, and the stator flange 22 includes a disc-shaped body 221. The stator iron core 21 is attached and fixed to a main surface of the disc-shaped body 221, and the disc-shaped body 221 is configured to be fixed to an end plate portion of a housing when the stator assembly 20 is placed in the housing. The stator iron core 21 may be fixedly or detachably connected to the main surface of the disc-shaped body 221, and the main surface may be defined as a surface having the largest area in the stator flange 22. In an exemplary embodiment, the disc-shaped body 221 may be disc-shaped, and two opposite side surfaces of the disc-shaped body 221 each may be defined as a main surface. The stator flange 22 may be configured to mount the stator iron core 21 on the end plate portion of the housing of the axial flux motor, and the stator assembly 20 may be used as a mounting positioning reference for the stator flange 22, thereby improving the positioning accuracy and machining efficiency of the stator assembly 20.

Figure 16:
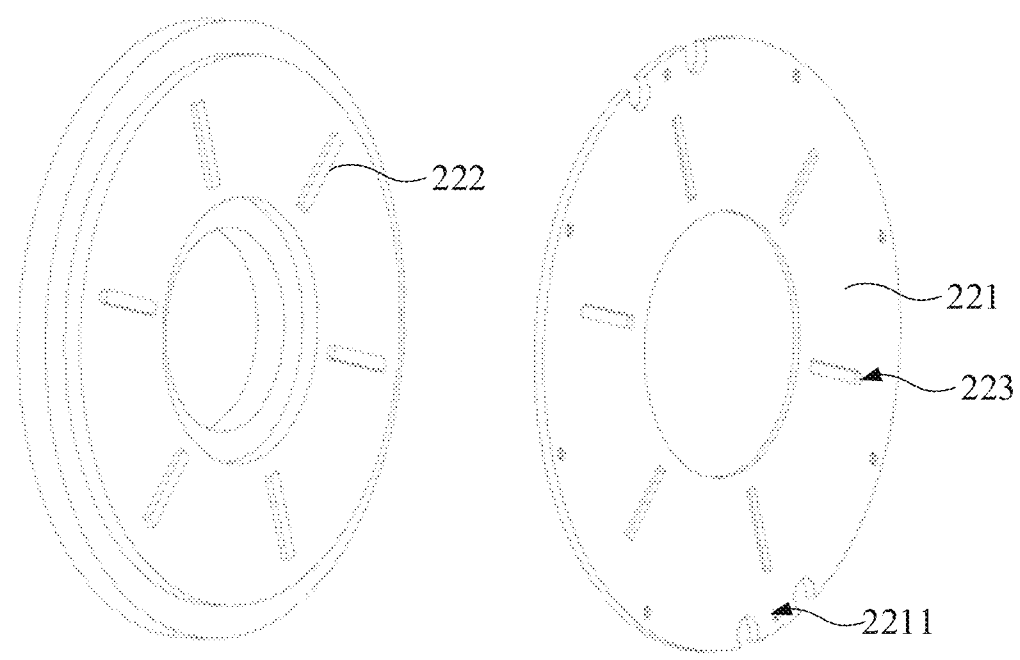
FIG. 16 is a schematic exploded view of the stator assembly according to the first embodiment of the present disclosure.

Referring to FIG. 16, it is a schematic exploded view of the stator assembly according to the first embodiment of the present disclosure.

The disc-shaped body 221 has a plurality of through grooves 223 connecting the two main surfaces of the disc-shaped body 221 at the two sides. The stator iron core 21 is attached to one of the two main surfaces of the disc-shaped body 221, and is provided with a plurality of bosses 222 corresponding to the plurality of through grooves 223. Each of the bosses 222 are inserted in a corresponding one of the through grooves 223, and the disc-shaped body 221 and the stator iron core 21 are welded and fixed to each other along engagement edges of the through grooves 223 and the bosses 222. In another exemplary embodiment of the present disclosure, the plurality of bosses 222 and the through grooves 223 are in a one-to-one correspondence. One of the bosses 222 may be inserted in a corresponding one of the through grooves 223, and both may fix the disc-shaped body 221 and the stator iron core 21 through welding, such that the stator iron core 21 and the stator flange 22 are assembled to the housing as a piece. The shape of the through groove 223 and the shape of the protrusion 222 are similar. In an exemplary embodiment, the through groove 223 and the protrusion 222 both have a square structure. After the protrusion 222 is inserted into the through groove 223, the stator iron core 21 and the stator flange 22 are limited relative to each other by the through groove 223 and the protrusion 222, to facilitate welding and fixing the disc-shaped body 221 and the stator iron core 21 to each other along the engagement edges of the through groove 223 and the protrusion 222. Thus, it is possible to reduce the difficulty in processing and assembling the stator iron core 21 of the stator assembly 20, and to reduce the electromagnetic loss of the stator iron core 21.

In an exemplary embodiment of the present disclosure, the plurality of through grooves 223 are spaced apart from one another along the circumferential direction Z of the disc-shaped body 221. The through grooves 223 may be arranged at different positions of the disc-shaped body 221 in the circumferential direction Z of the disc-shaped body 221. The plurality of through grooves 223 may be arranged at equal intervals along the circumferential direction Z of the disc-shaped body 221 to improve the stability of the connection between the disc-shaped body 221 and the stator iron core 21.

In another exemplary embodiment of the present disclosure, the plurality of through grooves 223 extends in the radial direction Y of the disc-shaped body 221 and spread radially. The through grooves 223 may extend at different positions of the disc-shaped body 221 in the radial direction Y of the disc-shaped body 221 to improve the stability of the connection between the disc-shaped body 221 and the stator iron core 21.

Figure 17:
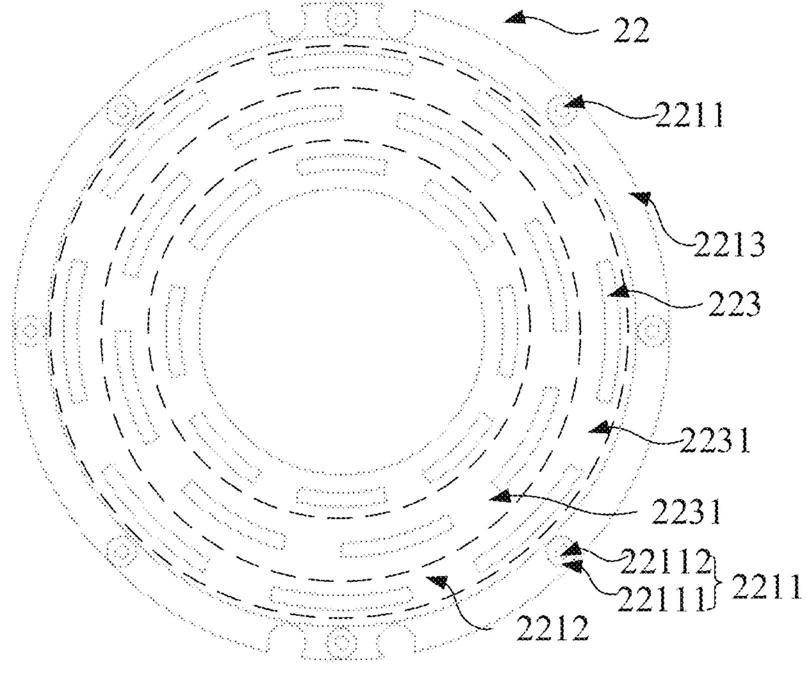
FIG. 17 is a schematic structural view of a stator flange according to an embodiment of the present disclosure.

Referring to FIG. 17, is is a schematic structural view of a stator flange according to an embodiment of the present disclosure.

A plurality of through grooves 223 extends in an arc shape along the circumferential direction Z of the disc-shaped body 221. The plurality of through grooves 223 may be spaced apart from one another along the circumferential direction Z of the disc-shaped body 221, to increase the welding area between the disc-shaped body 221 and the stator iron core 21 and improve the stability of the connection between the disc-shaped body 221 and the stator iron core 21.

Further, the plurality of through grooves 223 are divided into at least two through groove groupings 2231, which are arranged in a sleeved manner and at intervals along the radial direction Y of the disc-shaped body 221. Each of the at least two through groove groupings 2231 includes at least two through grooves 223 spaced apart from each other along the circumferential direction Z of the disc-shaped body 221. The through grooves 223 of the same group may be located on a circumference of the same reference circle, and the through grooves 223 of different groups may be located on circumferences of reference circles with different diameters. The numbers of through grooves 223 in different through groove groupings 2231 may be the same, each of the through grooves 223 in the through groove grouping 2231 closer to the central axis of the disc-shaped body 221 has a shorter extending length, and the through grooves 223 of the same grouping may be spaced apart from one another along the circumferential direction Z of the disc-shaped body 221. The through grooves 223 in two through groove groupings 2231 that are arranged adjacent to each other are at least partially staggered along the circumferential direction Z of the disc-shaped body 221. In an exemplary embodiment, the plurality of through grooves 223 may be divided into three through groove groupings 2231, and each of the three through groove groupings 223 includes eight through grooves 223. The eight through grooves 223 are all arranged in an arc shape, and are arranged at equal intervals along the circumferential direction Z of the disc-shaped body 221. The through grooves 223 among different groupings are spaced apart from one another in the radial direction Y of the disc-shaped body 221, and the through grooves 223 in the outermost through groove grouping 2231 and the through grooves 223 in the middle through groove grouping 2231 are at least partially staggered along the circumferential direction Z of the disc-shaped body 221. In this way, the structural strength of the disc-shaped body 221 can be ensured, and the stability of the connection between the disc-shaped body 221 and the stator iron core 21 can be further improved.

Figure 18:
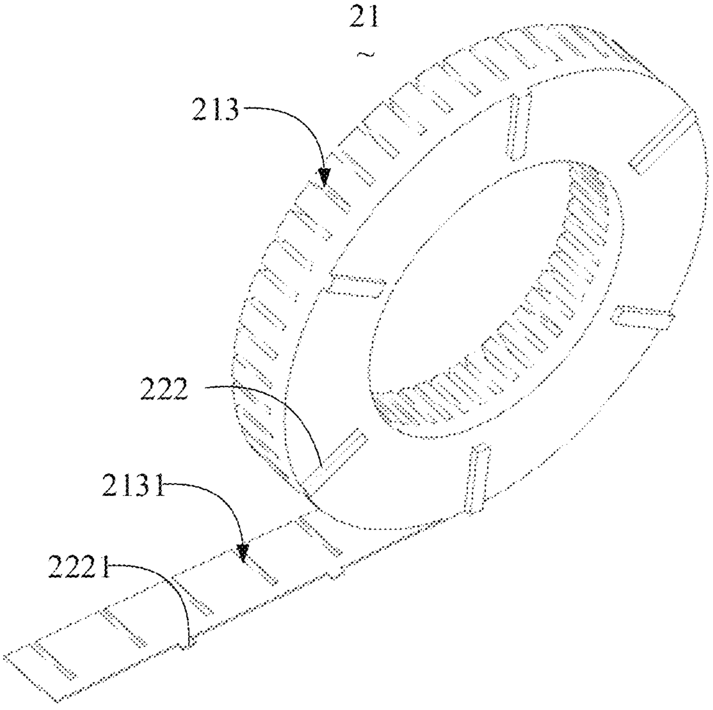
FIG. 18 is a schematic structural view of a stator iron core according to an embodiment of the present disclosure.
Figure 19:
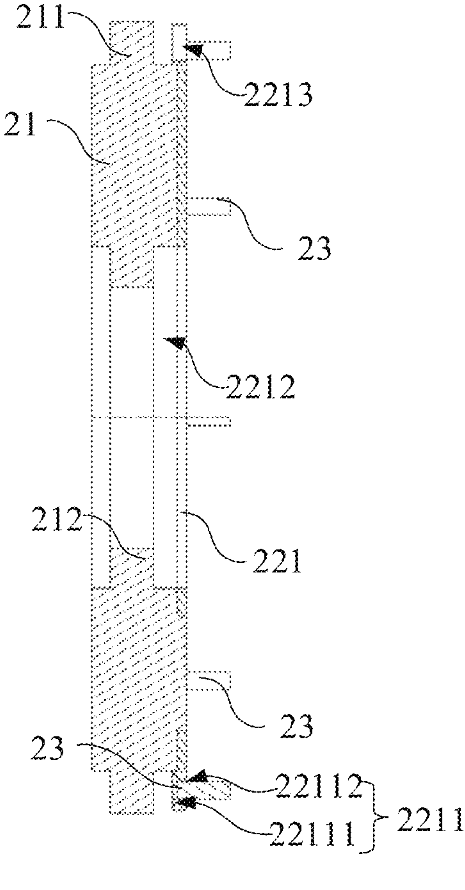
FIG. 19 is a schematic sectional view of the stator iron core shown in FIG. 15.

Referring to FIG. 18, it is a schematic structural view of a stator iron core according to an embodiment of the present disclosure.

The stator iron core 21 is formed by winding a strip sheet, a side edge of the strip sheet is provided with a protrusion 2221 protruding therefrom, and another side edge of the strip sheet has an open slot 2131 recessed therefrom. The protrusion 2221 forms a boss 222 along with the winding of the strip sheet, and the open slot 2131 forms a stator slot 213 for accommodating a coil along with the winding of the strip sheet. Compared with the conventional die casting, the stator iron core 21 is formed by winding a strip-sheet material such that the stator iron core 21 may be molded efficiently. In addition, a plurality of the protrusions 2221 are arranged in a protruding manner on one side of the strip sheet, and are arranged at predetermined intervals on the one side of the strip sheet. After the strip sheet is wound to form the stator iron core 21, the plurality of protrusions 2221 are fitted at a back part of the stator iron core 21 to form the bosses 222, to facilitate efficient molding of the bosses 222. Similarly, a plurality of open slots 2131 may be formed at predetermined intervals on another side of the strip sheet. After the strip sheet is wound to form the stator iron core 21, the plurality of open slots 2131 is fitted on a side of the stator iron core 21 facing away from the bosses 222 to form the stator slots 213 for embedding the coil, thereby facilitating efficient molding of the open slots 2131.

Referring to FIGS. 15 to 19, FIG. 19 is a schematic sectional view of the stator iron core shown in FIG. 15.

The disc-shaped body 221 has a plurality of step holes 2211, and each of the step holes 2211 includes a first hole segment 22111 and a second hole segment 22112. The first hole segment 22111 connects the main surface of the disc-shaped body 221 facing towards the stator iron core 21, and the second hole segment 22112 connects the another main surface of the disc-shaped body 221 facing away from the stator iron core 21. An aperture of the first hole segment 22111 is greater than an aperture of the second hole segment 22112, thereby forming an annular platform at the connection of the second hole segment 22112 and the first hole segment 22111. The first hole segment 22111 and the second hole segment 22112 each may be a cylindrical hole, and the first hole segment 22111 and the second hole segment 22112 communicate with each other and further communicate with the two main surfaces of the disc-shaped body 221. The plurality of step holes 2211 may be arranged at equal intervals around the circumferential direction Z of the disc-shaped body 221, and the plurality of step holes 2211 is disposed away from the center of the disc-shaped body 221 in the radial direction Y of the disc-shaped body 221.

The stator assembly 20 includes fixing members 23, which are inserted into the step holes 2211, are sunk in the first hole segments 22111, and are supported on the first annular platform. The fixing members 23 each may also have a two-segment structure. A first section of the fixing member 23 has a dimension in the radial direction Y that is greater than a dimension of a second section of the fixing member 23 in the radial direction Y and smaller than a dimension of the first hole segment 22111 in the radial direction Y, such that the first section of the fixing member 23 is sunk in the first hole segment 22111 and is supported on the first annular platform. The second section of the fixing member 23 at least partially protrudes from the second hole segment 22112 and is then connected to the housing. The number of the fixing members 23 is the same as the number of the step holes 2211, and the fixing members 23 are in a one-to-one correspondence with the step holes 2211, i.e., each of the step hole 2211 is used to place one of the fixing members 23.

In an embodiment, each of the fixing member 23 is pre-inserted into one of the step hole 2211 before the disc-shaped body 221 is welded to the stator iron core 21, and the projection of the stator assembly 20 in the axial direction X of the stator assembly 20 covers the fixing member 23, such that the fixing member 23 is maintained in the step hole 2211. Before the disc-shaped body 221 and the stator iron core 21 are welded and fixed, the fixing member 23 is placed in the step hole 2211, and then the disc-shaped body 221 and the stator iron core 21 are connected and fixed, i.e., the fixing member 23 is held in the stepped hole 2211 by the annular platform and the stator iron core 21, such that the fixing member 23 does not disengage from the step hole 2211.

Further, the disc-shaped body 221 and the stator iron core 21 both are of a ring shape. the stator assembly 20 further includes a coil wound around the stator iron core 21, and the coil extends beyond ring surfaces of the stator iron core 21 at two sides in the radial direction Y of the stator assembly 20, to form an inner ring coil portion 212 and an outer ring coil portion 211. Since the stator iron core 21 is of a ring shape, when the coil is wound around the stator iron core 21, the coil may protrude from the inner ring side and the outer ring side of the stator iron core 21. A part of the coil protruding from the inner ring surface of the stator iron core 21 is the inner ring coil portion 212, and another part of the coil protruding from the outer ring surface of the stator iron core 21 is the outer ring coil portion 211.

The disc-shaped body 221 includes a central portion 2212 and an annular edge portion 2213 arranged around the central portion 2212. The annular edge portion 2213 cooperates with the central portion 2212 to form a recessed region. The stator iron core 21 is arranged in the recessed region. The step holes 2211 are arranged at the annular edge portion 2213, and a projection of the outer ring coil portion 211 along the axial direction X of the stator assembly 20 covers the fixing members 23. A thickness of the central portion 2212 may be smaller than a thickness of the annular edge portion 2213 to form the recessed region in the central portion 2212. The dimension of the recessed region may match the dimension of the main surface of the stator iron core 21, such that the stator iron core 21 may be placed in the recessed region and at least part of the outer circumferential surface of the stator iron core 21 is attached to the inner ring surface of the annular edge portion 2213. The step holes 2211 are disposed at the annular edge portion 2213 such that the projection of the outer ring coil portion 211 in the axial direction X of the stator assembly 20 covers the step holes 2211. Therefore, when the fixing members 23 are provided in the step holes 2211, the outer ring coil portion 211 covers the step holes 2211 such that the fixing members 23 are held within the step holes 2211 by the annular platform and the outer ring coil portion 211, such that the fixing members 23 do not disengage from the step holes 2211.

Further, at least one of the inner ring coil portion 212 and the outer ring coil portion 211 extends beyond the disc-shaped body 221 in the radial direction Y of the stator assembly 20 or is spaced apart from the disc-shaped body 221 in the axial direction X, such that the coolant introduced from the end plate portion is in direct contact with at least one of the inner ring coil portion 212 and the outer ring coil portion 211 when the stator assembly 20 is fixed to the end plate portion of the housing. In an exemplary embodiment of the present disclosure, the inner ring coil portion 212 or the outer ring coil portion 211 extends beyond the disc-shaped body 221 in the radial direction Y, or the inner ring coil portion 212 and the outer ring coil portion 211 both extend beyond the disc-shaped body 221 in the radial direction Y. In another exemplary embodiment of the present disclosure, the inner ring coil portion 212 and/or the outer ring coil portion 211 maintain a predetermined gap with the disc-shaped body 221 in the axial direction X of the disc-shaped body 221. In this way, the coolant may be in direct contact with the inner ring coil portion 212 and/or the outer ring coil portion 211 through the predetermined gap, and the amount of the contact of the coolant with the inner ring coil portion 212 and/or the outer ring coil portion 211 can be increased to improve the efficiency of the cooling of the coolant to the stator assembly 20.

Furthermore, a width of the disc-shaped body 221 in the radial direction Y is smaller than a width of the stator iron core 21 in the radial direction Y. Thus, the coolant may be further brought into direct contact with the stator iron core 21 not covered by the disc-shaped body 221, to further improve the efficiency of the cooling of the coolant to the stator assembly 20. In addition, it is possible to reduce the weight of the stator flange 22, which reduces the production cost.

The stator flange 22 and the fixing members 23 are non-magnetic members, thereby reducing electromagnetic loss.

Figure 20:
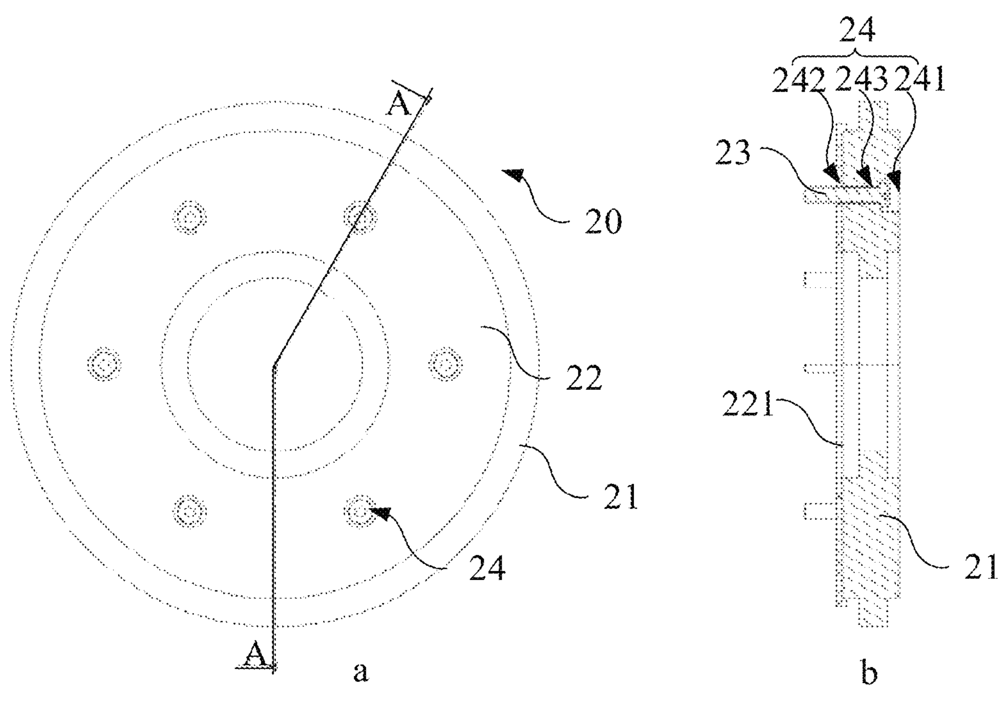
FIG. 20 is a schematic structural and sectional view of a stator assembly according to a second embodiment of the present disclosure.
Figure 21:
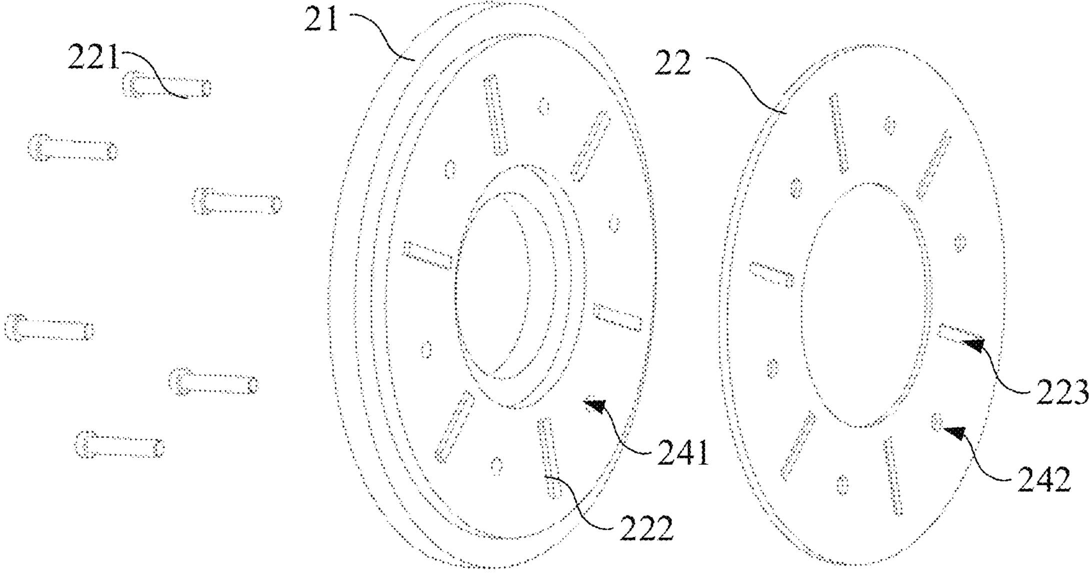
FIG. 21 is a schematic exploded view of the stator assembly according to the second embodiment of the present disclosure.

In the above embodiment of the stator assembly 20, the step holes are formed in the disc-shaped body 221, and are fixed by fitting the fixing members in the step holes of the disc-shaped body 221. However, in another embodiment of the present disclosure, both the stator flange 22 and the disc-shaped body 221 may be perforated to form step holes of another embodiment, with particular reference to FIGS. 20 and 21. FIG. 20 is s a schematic structural and sectional view of a stator assembly according to a second embodiment of the present disclosure, and FIG. 21 is a schematic exploded view of the stator assembly according to the second embodiment of the present disclosure. FIG. 20*a* is a schematic structural view of the stator assembly of the second embodiment, and FIG. 20*b* is a schematic sectional view taken along the direction A-A in FIG. 20*a*.

The stator assembly 20 has step holes 24, and the step holes 24 penetrates through the disc-shaped body 221 and the stator iron core 21 along the axial direction X of the stator assembly 20. The stepped holes 24 each include a first hole segment 241 and a second hole segment 242, the first hole segment 241 is located in the stator iron core 21 and connects the main surface of the stator iron core 21 facing away from the disc-shaped body 221, and the second hole segment 242 is located in the disc-shaped body 221 and connects the main surface of the disc-shaped body 221 facing away from the stator iron core 21. An aperture of the first hole segment 241 is greater than an aperture of the second hole segment 242. The first hole segment 241 and the second hole segment 242 may both be cylindrical holes. The first hole segment 241 is in communication with two main surfaces of the stator iron core 21 at two sides, the second hole segment 242 is in communication with two main surfaces of the disc-shaped body 221 at two sides, and the first hole segment 241 and the second hole segment 242 are correspondingly arranged in the axial direction X of the disc-shaped body 221.

The step holes 24 allow the fixing members 23 to be inserted from the side of the stator iron core 21 facing away from the disc-shaped body 221 when the stator assembly 20 is placed in the housing. The step holes 24 are sunk in the first hole segment 241, thereby securing the stator assembly 20 to the end plate portion of the housing. The fixing members 23 each may have a two-segment structure. A first segment of the fixing member 23 has a dimension in the radial direction Y greater than that of a second segment of the fixing member 23 in the radial direction Y, such that the first segment of the fixing member 23 is sunk in the first hole segment 241, and the second segment of the fixing member 23 is inserted in the second hole segment 242 and at least partially protrudes from the second hole segment 242.

In the present embodiment, the first hole segment 241 is formed at the stator iron core 21, the second hole segment 242 is formed at the disc-shaped body 221, and the fixing member 23 is sunk in the first hole segment 241. In this way, the stator assembly 20 may be fixed to the end plate portion of the housing without the stator iron core 21 avoiding the second hole segment 242, thereby increasing the overall volume of the stator iron core 21 and increasing the magnetic field strength of the stator assembly 20.

Furthermore, the step holes 24 each further include a third hole segment 243 that is located in the stator iron core 21 and connected between the first hole segment 241 and the second hole segment 242. An aperture of the third hole segment 243 is smaller than the aperture of the first hole segment 241, such that an annular platform is formed at the connection of the third hole segment 243 and the first hole segment 241, and the fixing members 23 are also press-fitted and fixed on the annular platform. A dimension of the third hole segment 243 in the radial direction Y may be the same as the dimension of the second hole segment 242 in the radial direction Y. The first hole segment 241 and the third hole segment 243 communicate with each other and jointly communicate with the two main surfaces of the stator iron core 21. A segment of the fixing member 23 with a larger dimension may be fixed to the annular platform, and another segment of the fixing member 23 with a smaller dimension may pass through the second hole segment 242 and the third hole segment 243 and protrude from the main surface of the disc-shaped body 221 facing away from the stator iron core 21. In this way, the stator iron core 21 may be further press-fitted and fixed to the disc-shaped body 221 by the fixing member 23. In addition, the aperture of the third hole segment 243 is smaller than the aperture of the first hole segment 241, which also contributes to alleviating the electromagnetic loss of the stator iron core 21.

Further, there are provided a plurality of the step holes 24, which is spaced apart from one another along the circumferential direction Z of the stator assembly 20. The plurality of step holes 24 may be equally spaced around the circumferential direction Z of the disc-shaped body 221, and the plurality of step holes 24 may be centrally located in the radial direction Y of the disc-shaped body 221. The number of the fixing members 23 is the same as the number of the step holes 24, and the fixing members 23 are in a one-to-one correspondence with the step holes 24, i.e., each of the step holes 24 may be used for placing one of the fixing members 23.

In another exemplary embodiment of the present disclosure, the step holes 24 and the through grooves 223 are arranged alternately in the circumferential direction Z of the stator assembly 20, to uniformly arrange the step holes 24 and the through grooves 223, reduce the machining difficulty of the stator assembly 20, improve the stability of mounting the stator iron core 21 and the stator flange 22, and improve the stability of mounting the stator assembly 20 and the housing.

When it is required to mount the stator assembly 20 in the housing of the axial flux motor, it is only necessary to insert the fixing member 23 into the step hole 24 from the side of the stator iron core 21 facing away from the disc-shaped body 221 and make the fixing member 23 to be sunk in the first hole segment 241, and then fix the stator assembly 20 to the end plate portion of the housing by the fixing member 23.

Figure 22:
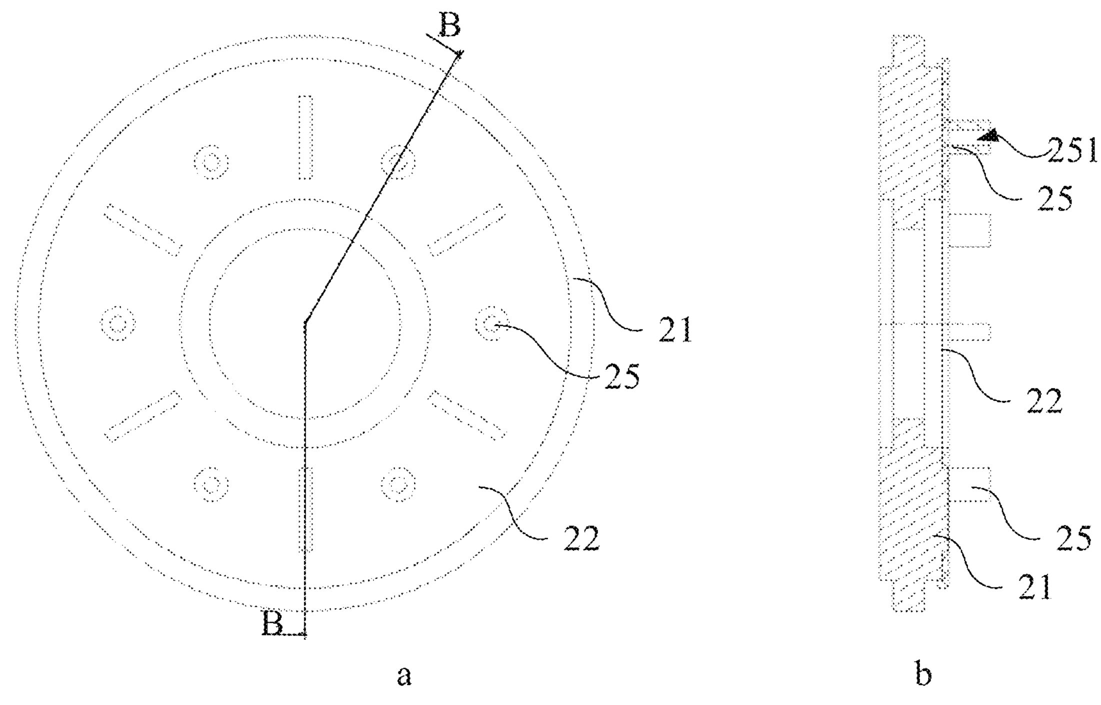
FIG. 22 is a schematic structural and sectional view of a stator assembly according to a third embodiment of the present disclosure.

In a third embodiment of the present disclosure, it is also possible to integrate the fixing member 23 on the stator flange 22, thereby simplifying the mounting of the stator iron core 21 and the stator flange 22 and improving the integration of the stator assembly 20. Referring to FIG. 22, it is a schematic structural and sectional view of a stator assembly according to a third embodiment of the present disclosure. FIG. 22*a* is a schematic structural view of the stator assembly of the third embodiment, and FIG. 22*b* is a schematic sectional view taken along the direction of B-B in FIG. 22*a*.

The stator flange 22 further includes a plurality of fixing posts 25 provided on the another main surface of the disc-shaped body 221 facing away from the stator iron core 21 and extending in the axial direction X of the stator assembly 20. The plurality of fixing posts 25 is configured to fix the stator flange 22 to the end plate portion of the housing when the stator assembly 20 is placed in the housing. The fixing posts 25 may have a hollow cylindrical shape, and may be perpendicular to the main surface of the stator iron core 21, such that the housing can improve the integration of the stator assembly 20. When it is required to fix the stator assembly 20 to the housing, the fixing posts 25 may be fixed to the end plate portion of the housing to achieve the above fixture, thereby simplifying the mounting of the stator iron core 21 and the stator flange 22 and improving the production efficiency. Further, the electromagnetic loss of the stator iron core 21 can be reduced without perforating the stator flange 22 and the stator iron core 21.

Furthermore, the fixing posts 25 each have an internally threaded hole 251 extending in the axial direction X. The internally threaded hole 251 may be threaded with a threaded stud to facilitate detachable mounting of the fixing posts 25 to the end plate portion of the housing, thereby simplifying the assembly process.

In addition, the plurality of fixing posts 25 is arranged to be spaced apart from one another in the circumferential direction Z of the stator assembly 20. A plurality of the thread studs may be equally spaced along the circumference Z of the stator assembly 20 to facilitate stable mounting of the stator assembly 20 to the end plate portion of the housing via the fixing posts 25.

The plurality of fixing posts 25 is integrally formed with the disc-shaped body 221, or is separately formed with the disc-shaped body 221 and assembled and fixed to the disc-shaped body 221.

Figure 23:
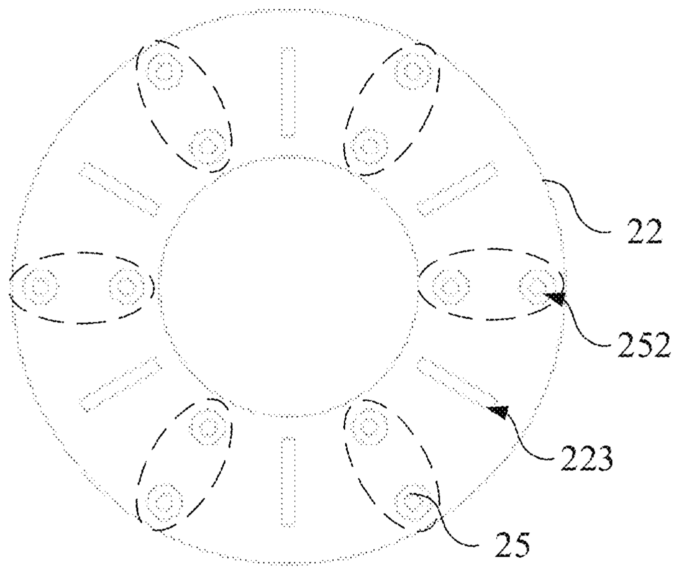
FIG. 23 is a schematic structural view of a stator flange of an embodiment in the stator assembly according to the third embodiment of the present disclosure.

Referring to FIG. 23, it is a schematic structural view of a stator flange of an embodiment in the stator assembly according to the third embodiment of the present disclosure. In another exemplary embodiment of the present disclosure, the plurality of fixing posts 25 is divided into a plurality of fixing post groupings 252 spaced apart from one another along the circumferential direction Z of the stator assembly 20. Each of the fixing post groupings 252 includes at least two fixing posts 25 spaced apart from each other along the radial direction Y of the stator assembly 20. The plurality of fixing post groupings 252 may be equally spaced along the circumferential direction Z of the stator assembly 20. The number of fixing posts 25 in each of the fixing post groupings 252 may be the same, and the fixing posts 25 in the fixing post grouping 252 may be arranged at the same interval in the radial direction Y of the stator assembly 20. Thus, the plurality of fixing posts 25 may be regularly distributed on the disc-shaped body 221 to stably mount the stator assembly 20 to the end plate portion of the housing by the fixing posts 25.

Figure 24:
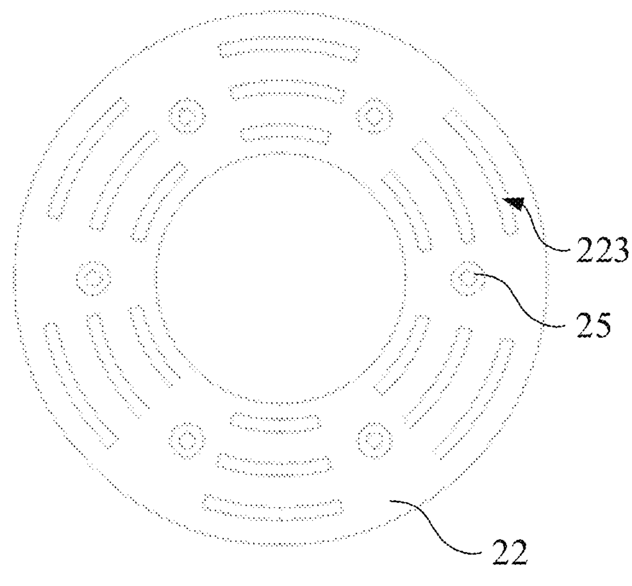
FIG. 24 is a schematic structural view of a stator flange of another embodiment in the stator assembly according to the third embodiment of the present disclosure.

Further, the fixing posts 25 and the through grooves 223 are arranged alternately along the circumferential direction Z of the stator assembly 20. A plurality of the through grooves 223 may be formed, and the plurality of through grooves 223 is arranged to be spaced apart from one another along the circumferential direction Z of the disc-shaped body 221. In an embodiment, referring to FIG. 22, the plurality of through grooves 223 extends in the radial direction Y of the disc-shaped body 221, and is radially spread. Referring to FIG. 23, the fixing post groupings 252 and the through grooves 223 are arranged alternately along the circumferential direction Z of the stator assembly 20. In another embodiment of the present disclosure, referring to FIG. 24, the plurality of through grooves 223 extends in an arc pattern in the circumferential direction Z of the disc-shaped body 221. In the present embodiment, the fixing posts 25 and the through grooves 223 are arranged alternately along the circumferential direction Z of the stator assembly 20, such that it is possible to improve not only the stability of the connection between the stator iron core 21 and the disc-shaped body 221 but also the stability of fixing the disc-shaped body 221 to the end plate portion of the housing.

Figure 25:
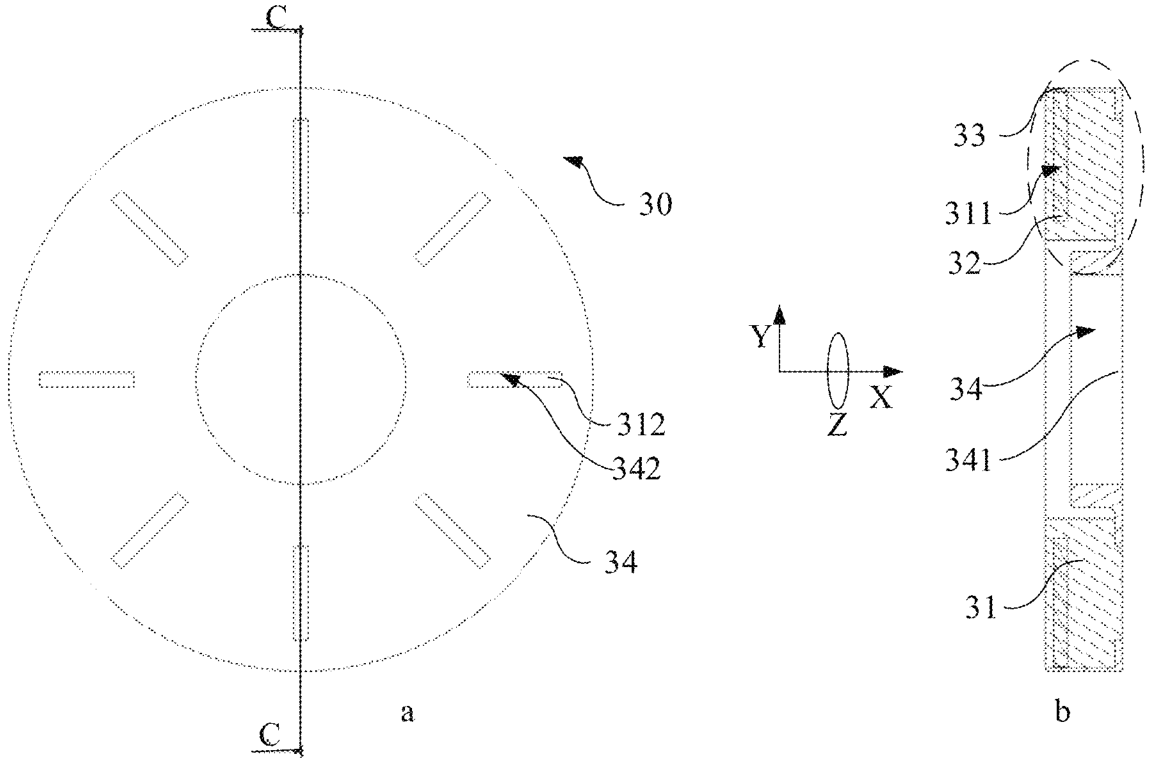
FIG. 25 is a schematic structural and sectional view of a rotor assembly according to a first embodiment of the present disclosure.
Figure 26:
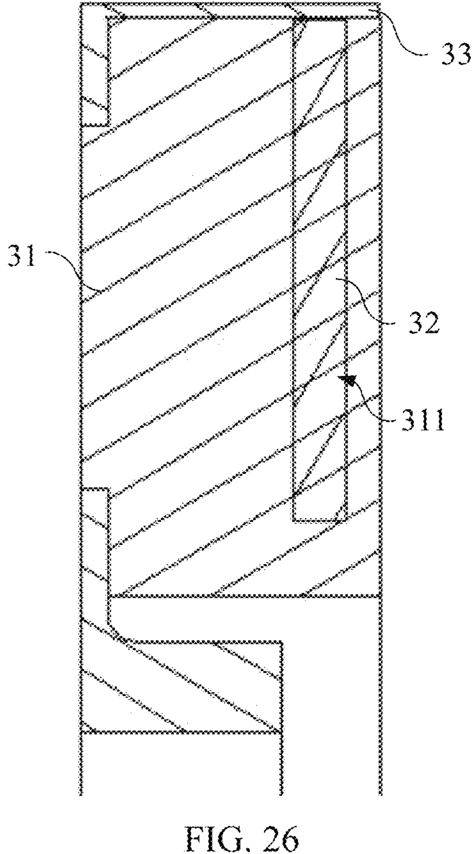
FIG. 26 is a schematic enlarged view of a dashed frame in FIG. 25.
Figure 27:
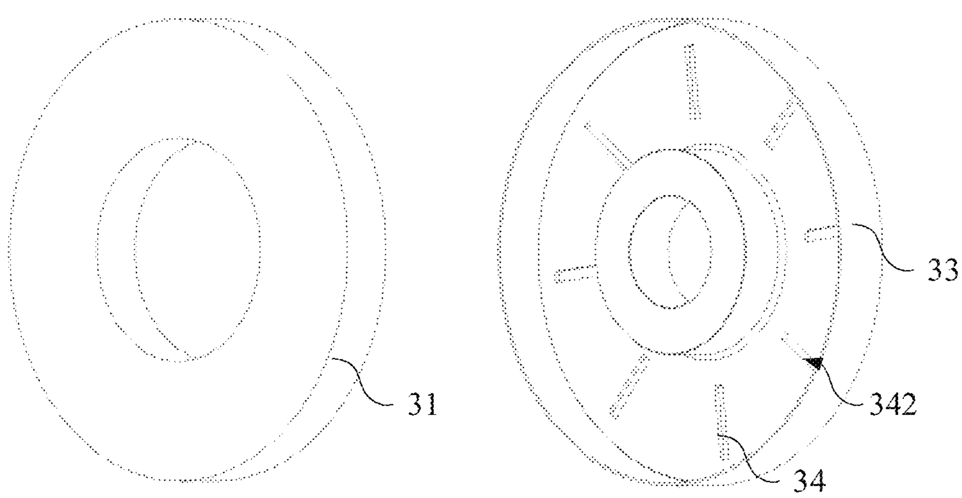
FIG. 27 is a schematic exploded view of the rotor assembly according to the first embodiment of the present disclosure.

In order to facilitate machining efficiency of the rotor assembly, to facilitate accurate mounting of the rotor assembly within the housing, and to facilitate direct cooling of the rotor assembly within the housing using a coolant, etc., the axial flux motor of the present disclosure further improves the rotor assembly. The following is a description of the structure of the rotor assembly with reference to FIGS. 25 to 27. FIG. 25 is a schematic structural and sectional view of a rotor assembly according to a first embodiment of the present disclosure. FIG. 26 is a schematic enlarged view of a dashed line box in FIG. 25. FIG. 27 is a schematic exploded view of the rotor assembly according to the first embodiment of the present disclosure. FIG. 25*a* is a schematic structural view of the rotor assembly of the first embodiment, and FIG. 25*b* is a schematic sectional view taken along the C-C direction in FIG. 25.

The rotor assembly 30 includes a rotor iron core 31, magnetic blocks 32, and a stopper 33. The rotor iron core 31 is provided with rotor slots 311, each of which has an open end at an outer circumferential surface of the rotor iron core 31, and each of the magnetic blocks 32 is provided in one of the rotor slots 311. The rotor iron core 31 may have a circular ring shape such that the rotor assembly 30 is mounted in the axial flux motor. The rotor slot 311 is formed in the outer circumferential surface of the rotor iron core 31, and extends towards the inside of the rotor iron core 31 in the radial direction Y of the rotor assembly 30. The open end of the rotor slot 311 faces towards an outer side of the rotor iron core 31 such that the magnetic block 32 is embedded in the rotor slot 311 through the open end of the rotor iron core 31. The stopper 33 is located at the outer side of the rotor iron core 31 in the radial direction Y of the rotor assembly 30, and shields the open end in the axial direction X of the rotor assembly 30. The stopper 33 may be attached to an outer edge of the rotor iron core 31 and the open end may be shielded by the stopper 33, to limit the magnetic block 32 in the rotor slot 311 by the stopper 33.

With the above embodiment, the limit rotation speed capability of the rotor assembly 30 can be increased by limiting the magnetic block 32 in the rotor slot 311 using the stopper 33 to alleviate a risk of disengaging the magnetic block 32 from the rotor slot 311. Furthermore, the stopper 33, the magnetic blocks 32, and the rotor iron core 31 are integral into the rotor assembly 30, such that the integration of the rotor assembly 30 can be increased and the dimension of the axial flux motor can be reduced.

In addition, the stopper 33 is of an annular structure surrounding the rotor iron core 31 in the circumferential direction Z of the rotor assembly 30. A dimension of an inner side surface of the stopper 33 with the annular structure in the radial direction Y is equal to or slightly greater than a dimension of an outer peripheral surface of the rotor iron core 31 in the radial direction Y, such that the stopper 33 may surround the rotor iron core 31 and abut with the outer peripheral surface of the rotor iron core 31 to limit the magnetic blocks 32 in the rotor slots 311.

In an embodiment, the rotor iron core 31 includes first and second end surfaces opposite to each other along the axial direction X of the rotor assembly 30, and the rotor slots 311 are arranged between the first and second end surfaces along the axial direction X of the rotor assembly 30. The rotor slots 311 extend towards the inside of the rotor iron core 31 in the radial direction Y of the rotor assembly 30, and the magnetic blocks 32 located in the rotor slot 311 are limited in the axial direction X of the rotor assembly 30.

In an embodiment, the rotor assembly 30 further includes a rotor flange 34, and the rotor flange 34 includes a disc-shaped body 341. The rotor iron core 31 is attached and fixed to a main surface of the disc-shaped body 341, and the stopper 33 is separated from the rotor flange 34. The rotor flange 34 may be fixedly connected to the rotor iron core 31, and the rotor iron core 31 may be connected to the housing of the axial flux motor via the rotor flange 34, to reduce the manufacturing difficulty of the rotor assembly 30. Further, the rotor iron core 31 uses the rotor flange 34 as a mounting reference, which can improve the mounting accuracy of the rotor iron core 31 and the machining efficiency of the rotor assembly 30. The rotor iron core 31 is detachably connected to the disc-shaped body 341, or the disc-shaped body 341 is welded and fixed to the rotor iron core 31, and the stopper 33 is separated from the rotor flange 34 to simplify the processing difficulty of the rotor flange 34.

In another exemplary embodiment of the present disclosure, the stopper 33 is fixed to the disc-shaped body 341, and the stopper 33 may be fixed to the disc-shaped body 341 through welding or formed integrally with the disc-shaped body 341, thereby improving the integration of the rotor assembly 30, improving the structural stability of the stopper 33, and improving the stopping effect.

Further, the stopper 33 is integrally formed with the disc-shaped body 341. Thus, the assembly difficulty is simplified, the structural stability of the stopper 33 is improved, and the stopping effect is improved.

In another exemplary embodiment of the present disclosure, the stopper 33 is attached to the outer circumferential surface of the rotor iron core 31. An end of the stopper 33 is connected to an outer edge of the disc-shaped body 341, and extends in the axial direction X of the rotor assembly 30 to cover the outer circumferential surface of the rotor iron core 31 on two sides of each of the rotor slots 311. Thus, the rotor flange 34 may be used as a mounting reference, and when the rotor iron core 31 and the disc-shaped body 341 are assembled, the stopper 33 is used as a positioning reference to improve the alignment effect of the rotor iron core 31 and the disc-shaped body 341.

In an embodiment, the disc-shaped body 341 has a plurality of first through grooves 342 communicating with two main surfaces of the disc-shaped body 341. The rotor iron core 31 has a plurality of bosses 312 corresponding to the plurality of first through grooves 342, and each of the bosses 312 is inserted in a corresponding one of the first through grooves 342. The disc-shaped body 341 and the rotor iron core 31 are welded and fixed to each other along engagement edges of the first through grooves 342 and the bosses 312 at a side of the disc-shaped body 341 facing away from the rotor iron core 31. Thus, it is possible to reduce the difficulty in processing and assembling the rotor iron core 31 of the rotor assembly 30, and to reduce the electromagnetic loss of the rotor iron core 31. The plurality of bosses 312 and the plurality of first through grooves 342 are in a one-to-one correspondence in number. Each of the bosses 312 may be inserted into one of the first through grooves 342, and the disc-shaped body 341 may be fixed to the stator iron core through welding therebetween, such that the rotor iron core 31 and the rotor flange 34 may be assembled to the housing as an integral part. The first through grooves 342 are similar in shape to the bosses 312. In an exemplary embodiment, both the first through groove 342 and the boss 312 are of a square structure. After the boss 312 is inserted into the first through groove 342, the first through groove 342 and the boss 312 limit each other between the rotor iron core 31 and the rotor flange 34, to facilitate welding and fixing the disc-shaped body 341 and the stationary rotor iron core 31 to each other along the engagement edges of the first through grooves 342 and the bosses 312. Since the manner of fixing between the core portion and the rotor flange of the rotor assembly of the present embodiment and the stator assembly described above is similar, the rotor assembly of the present embodiment may follow various modifications of the stator assembly described above.

Figure 28:
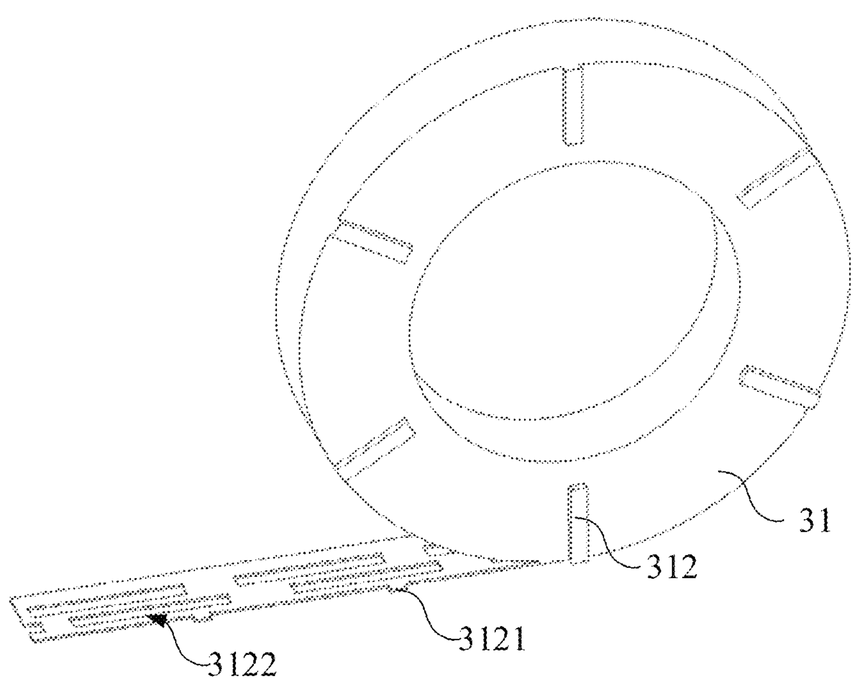
FIG. 28 is a schematic structural view of a rotor iron core according to an embodiment of the present disclosure.

Referring to FIG. 28, it is a schematic structural view of a rotor iron core according to an embodiment of the present disclosure.

The rotor iron core 31 is formed by winding a strip sheet, and a side edge of the strip sheet has protrusions 3121 protruding therefrom. The strip sheet has second through grooves 3122 that are located between two side edges of the strip sheet and in communication with two main surfaces of the strip sheet. The two side edges of the strip sheet form a first end surface and a second end surface of the rotor iron core 31 with the winding of the strip sheet, the protrusion 3121 forms the boss 312 with the winding of the strip sheet, and the second through groove 3122 forms the rotor slot 311 with the winding of the strip sheet. The rotor iron core 31 may be formed efficiently by winding a strip sheet in the present embodiment, as compared with conventional die casting. In addition, a plurality of the protrusions 3121 is disposed in a protruding manner on a side of the strip sheet, and is arranged at predetermined intervals on the side of the strip sheet. After the strip sheet is wound to form the rotor iron core 31, the plurality of protrusions 3121 is fitted on a back part of the stator iron core to form the bosses 312, to facilitate efficient molding of the bosses 312. Similarly, a plurality of second through grooves 3122 may be formed at predetermined intervals on another side of the strip sheet. After the strip sheet is wound to form the rotor iron core 31, the plurality of second through grooves 3122 is fitted to the side of the rotor iron core 31 facing away from the bosses 312 to form the rotor slots 311 for embedding the magnetic blocks 32, thereby facilitating efficient molding of the rotor slots 311.

Figure 29:
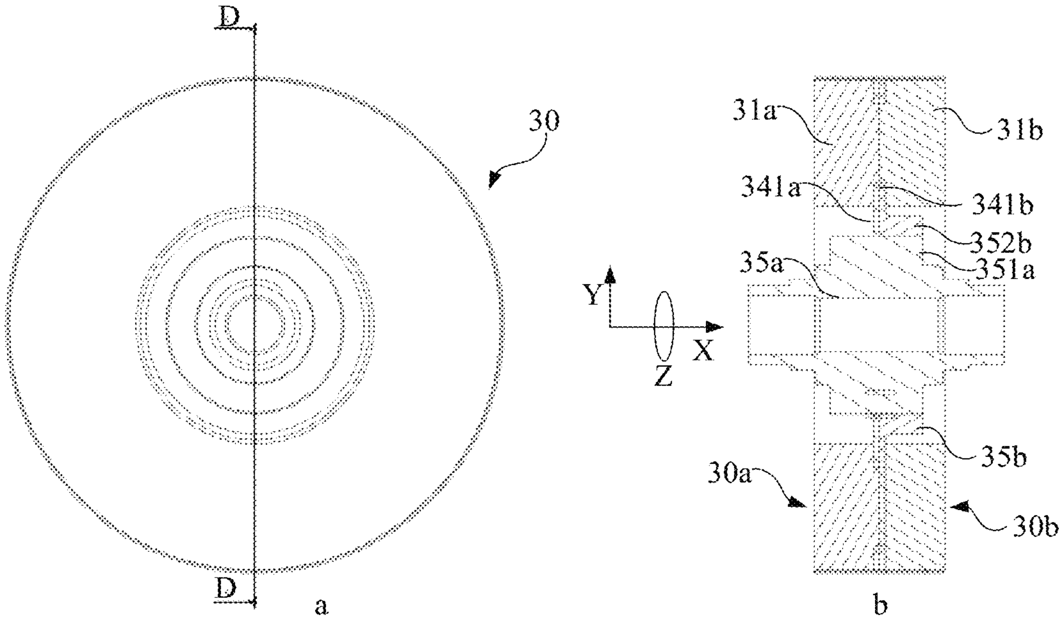
FIG. 29 is a schematic structural and sectional view of a rotor assembly according to a second embodiment of the present disclosure.
Figure 30:
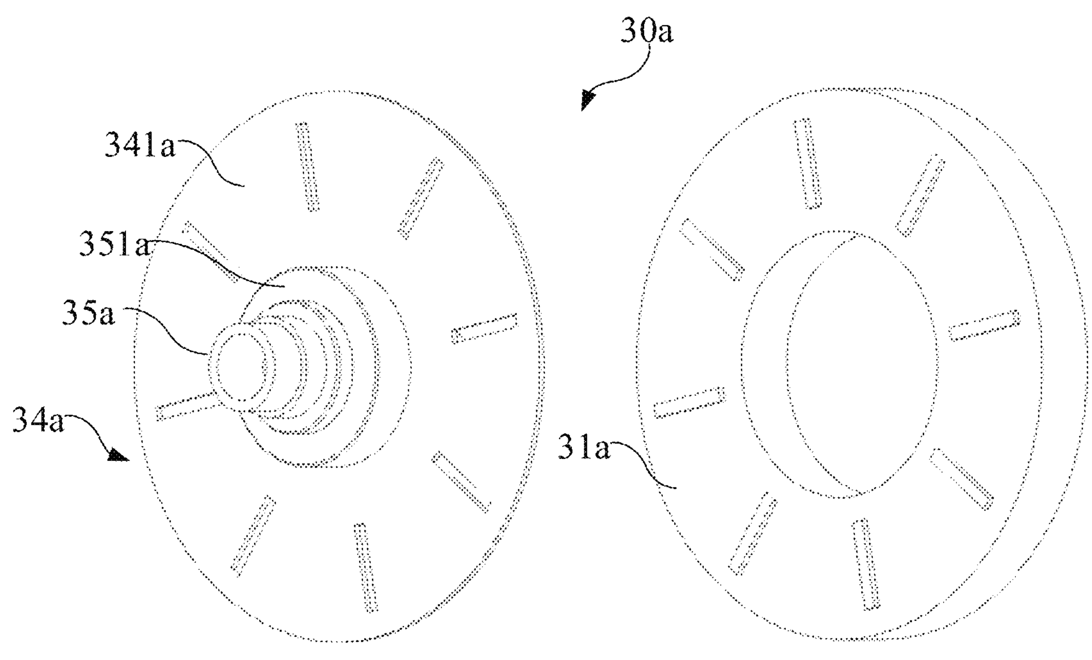
FIG. 30 is a schematic exploded view of a first rotor component of an embodiment in the rotor assembly according to the second embodiment of the present disclosure.
Figure 31:
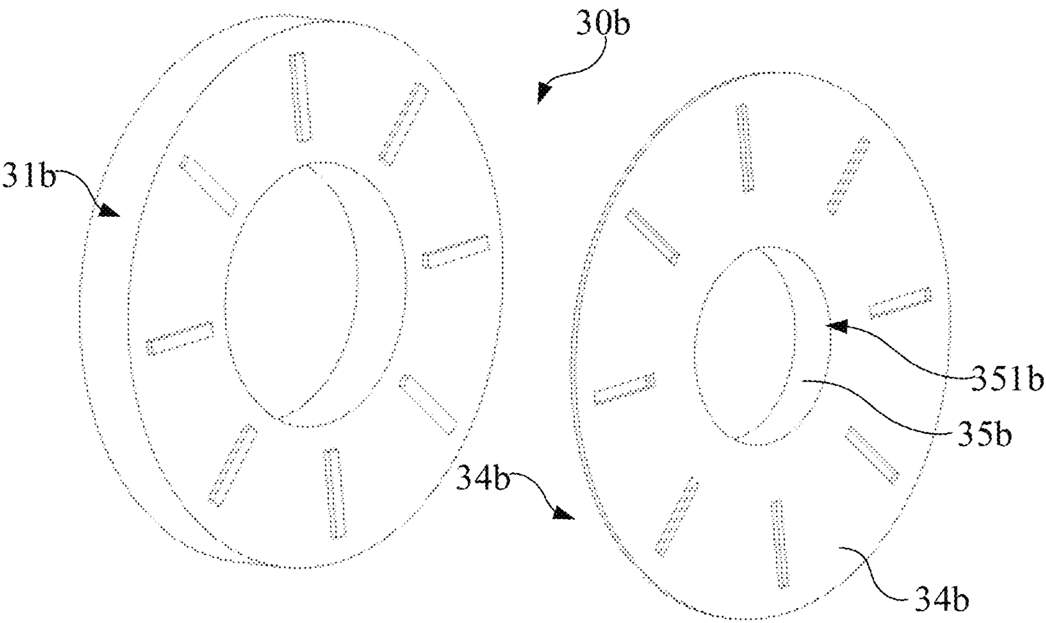
FIG. 31 is a schematic exploded view of a second rotor component of an embodiment in the rotor assembly according to the second embodiment of the present disclosure.

Referring to FIGS. 29 to 31, FIG. 29 is a schematic structural and sectional view of a rotor assembly according to a second embodiment of the present disclosure, FIG. 30 is a schematic exploded view of a first rotor component of an embodiment in the rotor assembly according to the second embodiment of the present disclosure, and FIG. 31 is a schematic exploded view of a second rotor component of an embodiment in the rotor assembly according to the second embodiment of the present disclosure. FIG. 29*a* is a schematic structural view of the rotor assembly of the second embodiment, and FIG. 29*b* is a schematic sectional view taken along the D-D direction in FIG. 29*a*.

The rotor assembly 30 includes a first rotor component 30*a* and a second rotor component 30*b*. The first rotor component 30*a* and the second rotor component 30*b* are assembled to form the rotor assembly 30, such that the output efficiency of the axial flux motor can be improved when the axial flux motor is formed using the rotor assembly 30.

The first rotor component 30*a* includes a first rotor flange 34*a* and a first rotor iron core 31*a*. The first rotor flange 34*a* includes a first disc-shaped body 341*a* and a rotary shaft 35*a* provided at the first disc-shaped body 341*a*, and the first rotor iron core 31*a* is disposed at a main surface of the first disc-shaped body 341*a* and surrounds around the rotary shaft 35*a*. The first disc-shaped body 341*a* may have a disc shape, two oppositely arranged side surfaces of the first disc-shaped body 341*a* with the disc shape may both define a main surface, and the rotary shaft 35*a* may be located in the middle of the first disc-shaped body 341*a*. For example, the rotary shaft 35*a* may be arranged coaxially with the first disc-shaped body 341*a*. The first rotor flange 34*a* may be fixedly connected to the first rotor iron core 31*a*, thereby reducing assembly difficulty of the first rotor component 30*a*. Moreover, the first rotor iron core 31*a* and the first rotor flange 34*a* may be integrated in the axial flux motor, thereby improving the integration of the axial flux motor.

The second rotor component 30*b* includes a second rotor flange 34*b* and a second rotor iron core 31*b*. The second rotor flange 34*b* includes a second disc-shaped body 341*b* and a shaft hole portion 35*b* provided at the second disc-shaped body 341*b*. The second rotor iron core 31*b* is disposed at a main surface of the second disc-shaped body 341*b*, and the shaft hole portion 35*b* has a shaft hole 351*b*. The second disc-shaped body 341*b* may be in the disc shape, two oppositely arranged side surfaces of the second disc-shaped body 341*b* each may define a main surface, and the shaft hole portion 35*b* may be located in the middle of the second disc-shaped body 341*b*. For example, the shaft hole portion 35*b* may be arranged coaxially with the second disc-shaped body 341*b*. The second rotor flange 34*b* may be fixedly connected to the second rotor iron core 31*b*, thereby reducing assembly difficulty of the second rotor assembly 30*b*. Further, the second rotor iron core 31*b* and the second rotor flange 34*b* may be integrated in the axial flux motor, thereby improving the integration of the axial flux motor.

The rotary shaft 35*a* is inserted into the shaft hole 351*b* in the axial direction of the rotor assembly 30. Another main surface of the first disc-shaped body 341*a* facing away from the first rotor iron core 31*a* and another main surface of the second disc-shaped body 341*b* facing away from the second rotor iron core 31*b* are attached and fixed to each other. In this way, the first rotor iron core 31*a* and the second rotor iron core 31*b* are mounted with the first rotor flange 34*a* and the second rotor flange 34*b* as a reference for positioning, thereby improving the positioning accuracy and assembling efficiency when the first rotor component 30*a* and the second rotor component 30*b* are mounted. In addition, the first rotor component 30*a* and the second rotor component 30*b* are connected back to back by the first rotor iron core 31*a* and the second rotor iron core 31*b*, and assembly difficulty of the two rotor components can be reduced.

In another exemplary embodiment of the present disclosure, one of the first disc-shaped body 341*a* and the second disc-shaped body 341*b* is fixed to another one of the first disc-shaped body 341*a* and the second disc-shaped body 341*b* through welding along an outer circumferential surface thereof. Thus, the manner of fixing the two rotor components can be simplified, and the fixing effect can be improved. In addition, the first rotor flange 34*a* and the second rotor flange 34*b* are axially welded along the outer peripheral surface thereof to improve the machining efficiency of the rotor assembly 30.

Furthermore, an outer peripheral surface of the first disc-shaped body 341*a* and an outer peripheral surface of the second disc-shaped body 341*b* are flush with each other in a radial direction of the rotor assembly 30, and the first disc-shaped body 341*a* and the second disc-shaped body 341*b* are welded and fixed to each other along engagement edges of their outer peripheral surfaces. Thus, the manner of fixing the two rotor components can be simplified and the fixing effect can be improved. The radial dimensions of the first disc-shaped body 341*a* and the second disc-shaped body 341*b* may be the same. When the first disc-shaped body 341*a* and the second disc-shaped body 341*b* are attached to each other, the outer peripheral surface of the first disc-shaped body 341*a* and the outer peripheral surface of the second disc-shaped body 341*b* are flush with each other in the radial direction of the rotor assembly 30. The outer peripheral surface of the first disc-shaped body 341*a* and the outer peripheral surface of the second disc-shaped body 341*b* are flush with each other in the radial direction of the rotor assembly 30, to reduce the radial dimension of the rotor assembly 30. Further, the welding of the first disc-shaped body 341*a* and the second disc-shaped body 341*b* along the outer circumferential surfaces thereof is facilitated, thereby improving the machining efficiency of the rotor assembly 30.

In another exemplary embodiment of the present disclosure, at an end of the shaft hole portion 35*b* facing away from the first disc-shaped body 341*a*, the rotary shaft 35*a* and the shaft hole portion 35*b* are welded and fixed to each other along the edge of the shaft hole 351*b*. When the rotary shaft 35*a* is inserted into the shaft hole 351*b* in the axial direction X of the rotor assembly 30, a part of the rotary shaft 35*a* extends to the end of the shaft hole portion 35*b* facing away from the first disc-shaped body 341*a*, and an outer circumferential surface of the rotary shaft 35*a* located in the shaft hole 351*b* is attached to an inner wall surface of the shaft hole 351*b*, such that the rotary shaft 35*a* and the shaft hole portion 35*b* may be welded and fixed to each other along the edge of the shaft hole 351*b*. Thus, the shaft hole portion 35*b* and the rotary shaft 35*a* are axially welded to improve the machining efficiency of the rotor assembly 30.

Moreover, the rotary shaft 35*a* has a first annular platform 351*a*, and a side of the shaft hole portion 35*b* facing away from the first disc-shaped body 341*a* has a second annular platform 352*b*. The second annular platform 352*b* surrounds the shaft hole 351*b*, and is flush with the first annular platform 351*a* in the axial direction of the rotor assembly 30, and is arranged to surround the first annular platform 351*a*. The rotary shaft 35*a* and the shaft hole portion 35*b* are fixed through welding along engagement edges of the first annular platform 351*a* and the second annular platform 352*b*. A radial dimension of the first annular platform 351*a* may be equal to or slightly smaller than a radial dimension of the second annular platform 352*b*, to facilitate insertion of the rotary shaft 35*a* into the shaft hole 351*b*. When the rotary shaft 35*a* is inserted in the shaft hole 351*b*, the first annular platform 351*a* and the second annular platform 352*b* are located on the same plane. In this way, the rotary shaft 35*a* and the shaft hole portion 35*b* are fixed through welding along the engagement edges of the first annular platform 351*a* and the second annular platform 352*b*, thereby improving the machining efficiency of the rotor assembly 30 and reducing the radial dimension of the rotor assembly 30.

Figure 32:
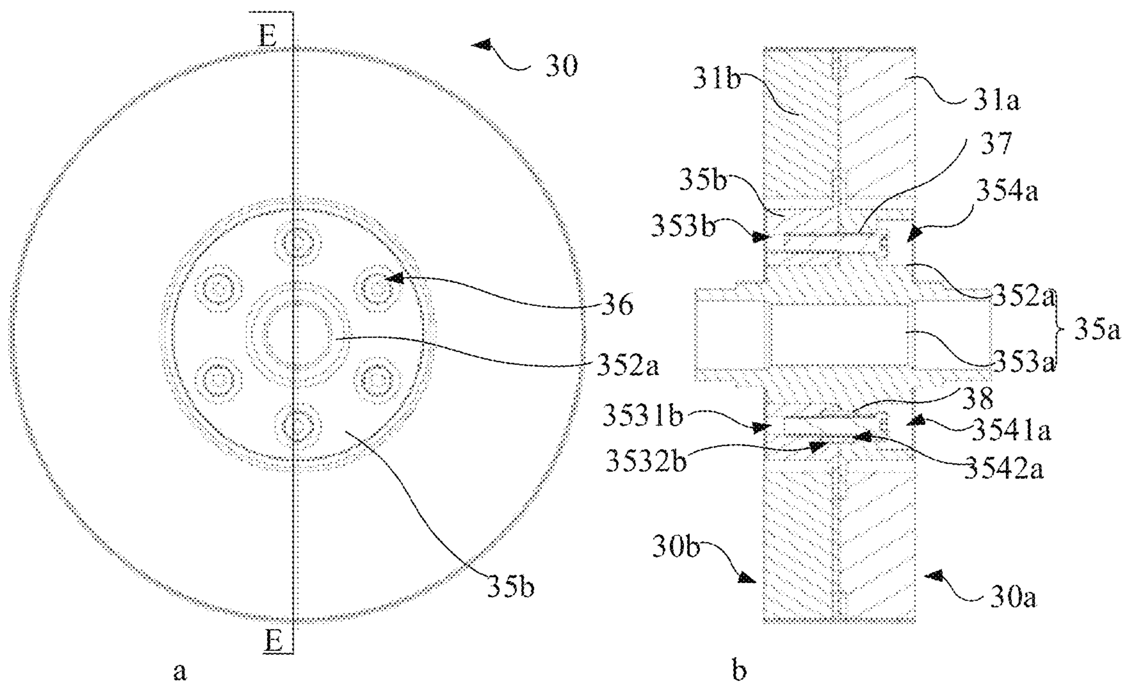
FIG. 32 is a schematic structural and sectional view of a rotor assembly according to a third embodiment of the present disclosure.
Figure 33:
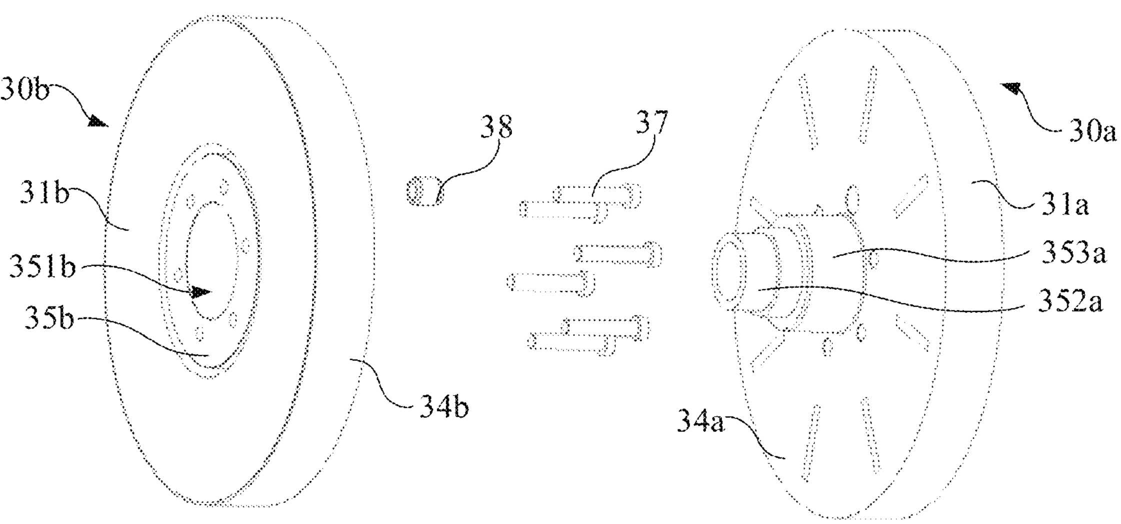
FIG. 33 is a schematic exploded view of the rotor assembly according to the third embodiment of the present disclosure.

In the second embodiment, the rotary shaft 35*a* and the shaft hole portion 35*b* may be welded for fixing. In the third embodiment, other fixing manners may also be used. With reference to FIGS. 32 and 33, FIG. 32 is a schematic structural and sectional view of a rotor assembly according to a third embodiment of the present disclosure. FIG. 33 is a schematic exploded view of the rotor assembly according to the third embodiment of the present disclosure. FIG. 32*a* is a schematic structural view of the rotor assembly of the third embodiment, and FIG. 32*b* is a schematic sectional view taken along the direction of E-E in FIG. 35*a*.

The rotary shaft 35*a* includes an insertion portion 352*a* and an engagement portion 353*a*. The insertion portion 352*a* is inserted in the shaft hole 351*b*, and a projection of the engagement portion 353*a* in the axial direction of the rotor assembly 30 overlap the shaft hole portion 35*b*, and the engagement portion 353*a* and the shaft hole portion 35*b* are provided with a plurality of sets of fixing matching pairs 36. The engagement portion 353*a* and the shaft hole portion 35*b* are fixed relative to each other by the fixing matching pairs 36. Thus, the manner of fixing the two rotor components is simplified, and the fixing effect is improved. The engagement portion 353*a* may have a radial dimension greater than that of the insertion portion 352*a*. When the insertion portion 352*a* is inserted into the shaft hole 351*b*, the engagement portion 353*a* and the shaft hole portion 35*b* may be attached face to face. In this way, the rotary shaft 35*a* and the shaft hole portion 35*b* are limited from each other in the radial direction of the rotor assembly 30 by the engagement portion 353*a* and the shaft hole portion 35*b*. The sets of fixing matching pairs 36 may be arranged at equal intervals along the circumferential direction of the rotor assembly 30, and the sets of fixing matching pairs 36 may be through holes communicating with each other. The rotary shaft 35*a* and the shaft hole portion 35*b* may be detachably connected by other components to improve the flexibility of the rotor assembly 30, thereby facilitating the disassembly and maintenance of the rotor assembly 30. In other embodiments, the fixing matching pairs 36 each may also be a pin-shaft matching pair or other matching pairs.

In addition, the fixing matching pairs 36 each include a first fixing hole 354*a* formed at the engagement portion 353*a* and a second fixing hole 353*b* formed at the shaft hole portion 35*b*. The engagement portion 353*a* and the shaft hole portion 35*b* are fixed to each other by a fixing member 37 inserted in the first fixing hole 354*a* and the second fixing hole 353*b*. The first fixing hole 354*a* and the second fixing hole 353*b* of the same matching pair may be coaxially arranged. The first fixing hole 354*a* and the second fixing hole 353*b* may be threaded holes, and the fixing member 37 may be a bolt. The number of fixing members 37 is in a one-to-one correspondence with the number of fixing matching pairs 36. At least one of the first fixing hole 354*a* and the second fixing hole 353*b* is a step hole, and the engagement portion 353*a* and the shaft hole portion 35*b* are detachably connected by inserting the fixing member 37 into the first fixing hole 354*a* and the second fixing hole 353*b*.

In another exemplary embodiment of the present disclosure, in at least one set of fixing matching pairs 36, the first fixing hole 354*a* includes a first outer hole segment 3541*a* and a first inner hole segment 3542*a* in communication with each other, and an aperture of the first inner hole segment 3542*a* is greater than an aperture of the first outer hole segment 3541*a*. The second fixing hole 353*b* includes a second outer hole segment 3531*b* and a second inner hole segment 3532*b* in communication with each other, and an aperture of the second inner hole segment 3532*b* is greater than an aperture of the second outer hole segment 3531*b*. The first inner hole segment 3542*a* and the second inner hole segment 3532*b* engage each other. The rotor assembly 30 includes a positioning pin 38 inserted in the first inner hole segment 3542*a* and the second inner hole segment 3532*b*, and the fixing member 37 passes through the first outer hole segment 3541*a*, the positioning pin 38, and the second outer hole segment 3531*b*. Radial dimensions of the first inner hole segment 3542*a* and the second inner hole segment 3532*b* may be the same. During the mounting of the engagement portion 353*a* and the shaft hole portion 35*b*, the positioning pin 38 may be firstly placed into the first inner hole segment 3542*a* or the second inner hole segment 3532*b*, the first fixing hole 354*a* and the second fixing hole 353*b* of the same fixing matching pair 36 are then aligned based on the position of the positioning pin 38, and finally the fixing member 37 is inserted into the first fixing hole 354*a* and the second fixing hole 353*b*, such that the shaft hole portion 35*b* and the engagement portion 353*a* are relatively fixed. Thus, the auxiliary positioning of the positioning pin 38 facilitates the relative fixation of the shaft hole portion 35*b* and the engagement portion 353*a* to improve the machining efficiency of the rotor assembly 30.

Figure 34:
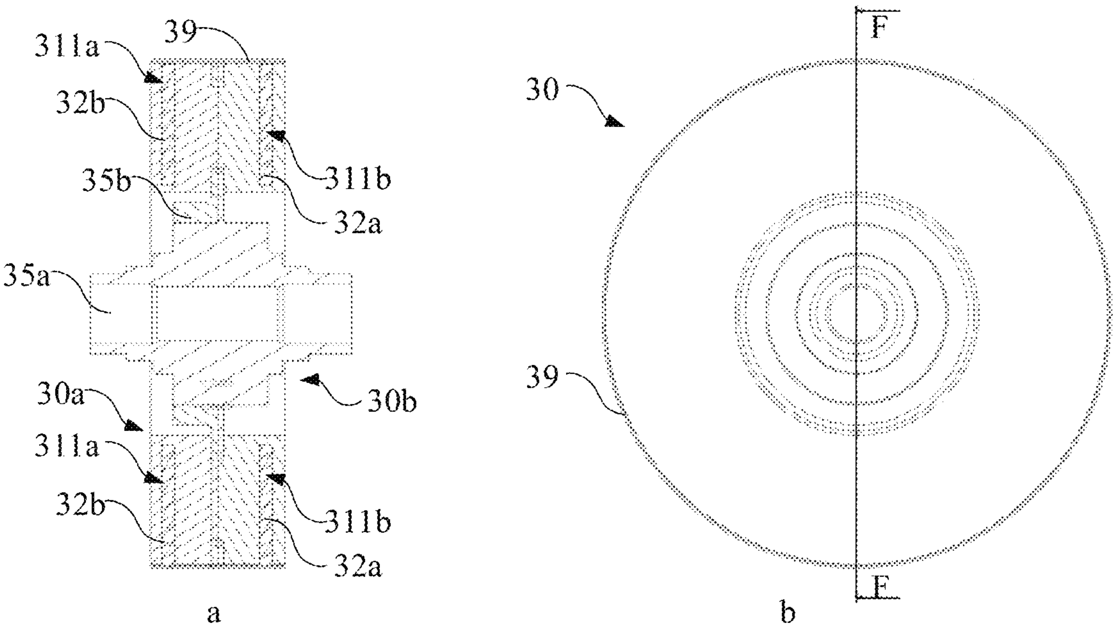
FIG. 34 is a schematic structural and sectional view of a rotor assembly according to a fourth embodiment of the present disclosure.
Figure 35:
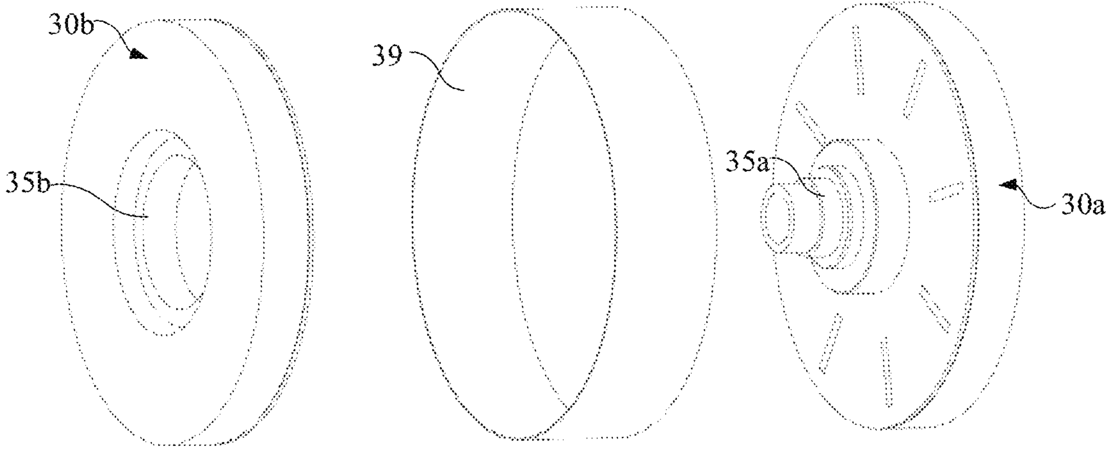
FIG. 35 is a schematic exploded view of the rotor assembly according to the fourth embodiment of the present disclosure.

In the present embodiment, a stopper may be provided on the outer peripheral sides of the first and second rotor components 30*a* and 30*b* to increase the limit rotary speed capability of the rotor assembly 30. Referring to FIGS. 34 and 35, FIG. 34 is a schematic structural and sectional view of a rotor assembly according to a fourth embodiment of the present disclosure, and FIG. 35 is a schematic exploded view of the rotor assembly according to the fourth embodiment of the present disclosure. FIG. 34*b* is a schematic structural view of the rotor assembly of the fourth embodiment, and FIG. 34*a* is a schematic sectional view taken along the direction F-F in FIG. 34*b*.

In another exemplary embodiment of the present disclosure, the outer peripheral surface of the first disc-shaped body 341*a* and the outer peripheral surface of the second disc-shaped body 341*b* are flush with each other in the radial direction of the rotor assembly 30. The first rotor iron core 31*a* has first rotor slots 311*a*, each of which has a first open end located on the outer peripheral surface of the first rotor iron core 31*a*. The first rotor component 30*a* further includes first magnetic blocks 32*a* provided in the first rotor slots 311*a*. The second rotor iron core 31*b* has second rotor slots 311*b*, and each of the second rotor slots 311*b* has a second open end located on the outer circumferential surface of the second rotor iron core 31*b*. The second rotor component 30*b* further includes second magnetic blocks 32*b* provided in the second rotor slots 311*b*. The first rotor iron core 31*a* and the second rotor iron core 31*b* may have a ring shape to facilitate mounting of the rotor assembly 30 in the axial flux motor. The first rotor slots 311*a* are formed in the outer circumferential surface of the first rotor iron core 31*a*, and extend towards the inside of the first rotor iron core 31*a* in the radial direction of the rotor assembly 30. The first open ends of the first rotor slots 311*a* face towards the outside of the first rotor iron core 31*a*, such that the first magnetic blocks 32*a* are embedded in the first rotor slots 311*a* from the first open ends of the first rotor iron core 31*a*. Similarly, the second rotor slots 311*b* are formed in the outer peripheral surface of the second rotor iron core 31*b*, and extends to the inside of the second rotor iron core 31*b* in the radial direction of the rotor assembly 30. The second open ends of the second rotor slots 311*b* face towards the outside of the second rotor iron core 31*b*, such that the second magnetic blocks 32*b* are embedded in the second rotor slots 311*b* from the second open ends of the second rotor iron core 31*b*.

The rotor assembly 30 further includes an annular stopper 39 integrally formed along the axial direction of the rotor assembly 30. The annular stopper 39 is arranged around the periphery of the first rotor iron core 31*a* and the second rotor iron core 31*b* to simultaneously shield the first open ends and the second open ends along the axial direction of the rotor assembly 30. A radial dimension of an inner circle of the annular stopper 39 is equal to or slightly greater than radial dimensions of outer peripherals of the first rotor iron core 31*a* and the second rotor iron core 31*b*, such that the annular stopper 39 may be attached to and surround around the outer peripherals of the first rotor iron core 31*a* and the second rotor iron core 31*b*. The annular stopper 39 is located at outer sides of the first rotor iron core 31*a* and the second rotor iron core 31*b* in the radial direction of the rotor assembly 30, and shields the first open ends and the second open ends in the axial direction of the rotor assembly 30. The annular stopper 39 may be attached to the outer circumferential surfaces of the first rotor iron core 31*a* and the second rotor iron core 31*b*, and the first open ends and the second open ends are shielded by the annular stopper 39 to limit the first magnetic blocks 32*a* in the first rotor slots 311*a* and limit the second magnetic blocks 32*b* in the second rotor slots 311*b* by the annular stopper 39.

With the above embodiment, limiting the first magnetic blocks 32*a* in the first rotor slots 311*a* and the second magnetic blocks 32*b* in the second rotor slots 311*b* by the annular stopper 39 can improve the limit rotation speed capability of the rotor assembly 30. Further, the annular stopper 39, the first magnetic blocks 32*a*, the second magnetic blocks 32*b*, the first rotor iron core 31*a*, and the second rotor iron core 31*b* are integrated into the rotor assembly 30, such that the integration of the rotor assembly 30 can be improved and the dimension of the axial flux motor can be reduced.

It should be noted that in the embodiment of the integrated dual rotor assembly 30, the first rotor component 30*a* and the second rotor component 30*b* may both include the embodiment shown for the single rotor assembly 30 described above. In an exemplary embodiment, the annular stopper 39 may be separated from the first rotor flange 34*a* and the second rotor flange 34*b*, the annular stopper 39 may be formed integrally with the first rotor flange 34*a* or the second rotor flange 34*b*, or the annular stopper 39 may be welded and fixed to the first rotor flange 34*a* or the second rotor flange 34*b*. The first disc-shaped body 341*a* and the first rotor iron core 31*a* as well as the second disc-shaped body 341*b* and the second rotor iron core 31*b* are fixed in such a manner that the through grooves and the bosses are fitted and welded to one another. Further, the first rotor iron core 31*a* and the second rotor iron core 31*b* may be formed by winding the strip sheet described above, respectively.

Finally, it should be noted that the above embodiments are only used to illustrate the technical solutions of the present disclosure, but do not to limit the present disclosure thereto. While the present disclosure has been described in detail with reference to the foregoing embodiments, it will be understood by those skilled in the art that the technical solutions described in the foregoing embodiments may still be modified, or some or all of the technical features may be equivalently replaced. Such modifications and substitutions do not depart from the spirit and scope of the embodiments of the present disclosure, and are intended to be included within the scope of the claims and the description. In particular, the technical features mentioned in the various embodiments may be combined in any manner as long as there is no structural conflict. The present disclosure is not limited to the particular embodiments disclosed herein, but includes all embodiments falling within the scope of the claims.

What is claimed is:

1. An axial flux motor, comprising:

a housing defining an accommodation space;

a stator assembly and a rotor assembly that are arranged in the accommodation space in an axial direction of the axial flux motor; and a partition assembly comprising a partition body, the partition body being arranged between the stator assembly and the rotor assembly, wherein the housing cooperates with the partition body to form a cooling space for accommodating a coolant and the stator assembly, the coolant in the cooling space being in direct contact with the stator assembly;

wherein the partition assembly further comprises a reinforcement member of a cylindrical shape, the reinforcement member is supported at a side of the partition body facing away from the stator assembly, the rotor assembly is disposed inside the reinforcement member; and wherein a flow return hole is formed at the reinforcement member, a coolant permeated into the partition assembly from the cooling space is discharged to an outer space of the partition assembly through the flow return hole.

2. The axial flux motor according to claim 1, wherein the housing comprises an end plate portion, the end plate portion having an inner end surface arranged towards a side of the stator assembly facing away from the rotor assembly; and the inner end surface of the end plate portion is spaced apart from the partition body in the axial direction to define two side boundaries of the cooling space in the axial direction.

3. The axial flux motor according to claim 1, wherein the housing comprises two cylindrical portions arranged in a sleeved manner in a radial direction of the axial flux motor, the two cylindrical portions being sealingly engaged with the partition body, respectively; and the cooling space is of a ring shape.

4. The axial flux motor according to claim 3, wherein the two cylindrical portions comprise a first cylindrical portion and a second cylindrical portion provided around the first cylindrical portion, the first cylindrical portion and the second cylindrical portion extending towards the stator assembly, and a rotary shaft of the rotor assembly passing through the first cylindrical portion; and the partition body comprises an inner ring matching portion and an outer ring matching portion provided around the inner ring matching portion, wherein the inner ring matching portion is sealingly engaged with the first cylindrical portion, and wherein the outer ring matching portion is sealingly engaged with the second cylindrical portion.

5. The axial flux motor according to claim 4, wherein the partition body is embedded inside the second cylindrical portion, a sealing engagement being formed between an outer peripheral surface of the outer ring matching portion and an inner peripheral surface of the second cylindrical portion; and/or the inner ring matching portion is provided with a third cylindrical portion, the third cylindrical portion and the first cylindrical portion being connected to each other in an insertion manner to form a sealing engagement between the third cylindrical portion and the first cylindrical portion.

6. The axial flux motor according to claim 4, wherein the inner ring matching portion and/or the outer ring matching portion are sealingly engaged with the stator assembly.

7. The axial flux motor according to claim 1, wherein the stator assembly comprises a stator iron core and a coil wound around the stator iron core, the stator iron core having a plurality of stator slots, and the coil being embedded in the plurality of stator slots; and the partition body comprises a plurality of embedded ribs, the plurality of embedded ribs being positioned in one-to-one correspondence with the plurality of stator slots, and each of the plurality of embedded ribs being embedded in a corresponding one of the plurality of stator slots.

8. The axial flux motor according to claim 7, wherein the housing comprises a first cylindrical portion and a second cylindrical portion provided around the first cylindrical portion, the first cylindrical portion and the second cylindrical portion extending towards the stator assembly, and a rotary shaft of the rotor assembly passing through the first cylindrical portion;

the partition body comprises an inner ring matching portion and an outer ring matching portion provided around the inner ring matching portion, the inner ring matching portion being sealingly engaged with the first cylindrical portion, and the outer ring matching portion being sealingly engaged with the second cylindrical portion;

the plurality of stator slots and the plurality of embedded ribs are radially spread with respect to the axial direction; and the plurality of embedded ribs is connected to the inner ring matching portion and/or the outer ring matching portion, respectively.

9. The axial flux motor according to claim 1, wherein the partition assembly comprises a reinforcement member of a cylindrical shape, the reinforcement member being supported at a side of the partition body facing away from the stator assembly, and the rotor assembly being disposed within the reinforcement member.

10. The axial flux motor according to claim 9, wherein the reinforcement member is engaged with the housing.

11. The axial flux motor according to claim 1, wherein the partition assembly has a plurality of pressure relief holes formed at intervals in a circumferential direction of the axial flux motor.

12. The axial flux motor according to claim 11, wherein the rotor assembly is spaced apart from the partition body in the axial direction;

an air gap is formed between the rotor assembly and the partition body; and the air gap is in communication with an outer space of the partition assembly through the plurality of pressure relief holes.

13. The axial flux motor according to claim 1, wherein the reinforcement member further has a plurality of pressure relief holes, the plurality of pressure relief holes being arranged at intervals at an edge of the reinforcement member facing towards the partition body in a circumferential direction of the axial flux motor; and the flow return hole is centrally located with respect to edges of the reinforcement member at two sides in the axial direction.

14. The axial flux motor according to claim 1, wherein the stator assembly comprises a stator iron core of a ring shape and a coil wound around the stator iron core, the coil protruding from two opposite ring side surfaces of the stator iron core in a radial direction of the axial flux motor to form an inner ring coil portion and an outer ring coil portion, the inner ring coil portion and/or the outer ring coil portion being located in the cooling space, and the coolant in the cooling space being in direct contact with the inner ring coil portion and/or the outer ring coil portion.

15. The axial flux motor according to claim 1, wherein the housing comprises an end plate portion having an inner end surface arranged towards a side of the stator assembly facing away from the rotor assembly;

a cooling channel is formed at the inner end surface of the end plate portion, a side of the partition body facing towards the end plate portion, and/or the stator assembly; and the coolant in the cooling space flows along the cooling channel.

16. An electric device, comprising the axial flux motor according to claim 1.

17. A vehicle, comprising the axial flux motor according to claim 1.

* * * * *